(12) United States Patent
Milenkovic

(10) Patent No.: US 8,245,595 B2
(45) Date of Patent: Aug. 21, 2012

(54) TWO-AXIS NON-SINGULAR ROBOTIC WRIST

(75) Inventor: Paul H. Milenkovic, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 593 days.

(21) Appl. No.: 12/433,582

(22) Filed: Apr. 30, 2009

(65) Prior Publication Data

US 2010/0275720 A1   Nov. 4, 2010

(51) Int. Cl.
*B25J 17/02* (2006.01)
(52) U.S. Cl. .................................... 74/490.06
(58) Field of Classification Search ............. 74/471 XY, 74/490.05, 490.06; 901/28, 29
See application file for complete search history.

(56) References Cited

U.S. PATENT DOCUMENTS

| | | | |
|---|---|---|---|
| 4,686,866 A * | 8/1987 | Rosheim | 74/490.06 |
| 4,729,253 A * | 3/1988 | Rosheim | 74/490.06 |
| 4,744,264 A | 5/1988 | Milenkovic | |
| 4,878,393 A | 11/1989 | Duta et al. | |
| 4,907,937 A | 3/1990 | Milenkovic | |
| 5,036,724 A * | 8/1991 | Rosheim | 74/490.06 |
| 5,699,695 A | 12/1997 | Canfield et al. | |
| 5,893,296 A | 4/1999 | Rosheim | |
| 5,979,264 A | 11/1999 | Rosheim | |
| 6,026,703 A | 2/2000 | Stanisic et al. | |
| 6,418,811 B1 | 7/2002 | Rosheim | |
| 6,557,432 B2 | 5/2003 | Rosheim | |
| 6,658,962 B1 | 12/2003 | Rosheim | |
| 2009/0314118 A1 * | 12/2009 | Li | 74/490.01 |

OTHER PUBLICATIONS

Gosselin, C.M. et al., The agile eye: a high-performance three-degree-of-freedom camera-orienting device, Robotics and Automation, 1994 IEEE International Conference on Robotics and Automation, San Diego, CA., pp. 781-786.
Gosselin, C. et al., The Optimum Kinematic Design of a Spherical Three-Degree-of Freedom Parallel Manipulator, Journal of Mechanisms, Transmissions, and Automation in Design, Jun. 1989, 111, pp. 202-207.
Gregorio, R.D., Kinematics of the 3-RSR Wrist, IEEE Transactions on Robotics, Aug. 2004, 20(4), pp. 750-754.
Herve, J.M., Uncoupled Actuation of Pan-Tilt Wrists, IEEE Transactions On Robotics, Feb. 2006, 22(1), pp. 56-64.
Milenkovic, P.H., Non-Singular R-S-R R-U Spherical Wrist, Apr. 11, 2008, University of Wisconsin-Madison, pp. 1-10.

(Continued)

*Primary Examiner* — Thomas R Hannon
*Assistant Examiner* — Phillip A Johnson
(74) *Attorney, Agent, or Firm* — Armstrong Teasdale LLP

(57) ABSTRACT

In a robotic system having a two-axis robotic wrist connected to a reference member, the wrist has a movable member movable relative to the reference member in pitch and yaw. A first serial chain linkage connects the movable member to the reference member and a second serial chain linkage connects the movable member to the reference member in parallel relationship with the first serial chain linkage. The linkages are configured to constrain the movable to spherical movement, and such that the robotic wrist is non-singular, non-overconstrained, and non-overactuated. Actuation of a pair of revolute joints connected to the reference member deflects the movable member in pitch and yaw. The roll angle resulting from deflection in pitch and yaw is that of an intersecting-shaft constant-velocity coupling connecting the reference member to the movable member.

24 Claims, 24 Drawing Sheets

OTHER PUBLICATIONS

Milenkovic, P.H., Triangle Pseudo-Congruence in Constraint Singularity of Constant-Velocity Couplings, Aug. 22, 2008, University of Wisconsin-Madison, pp. 1-9.

Milenkovic, V., New Nonsingular Robot Wrist Design, Robots 11/17th ISIR Conference Proceedings RI/SME, Apr. 27-30, 1987, pp. 13.29-14.42, Chicago, Illinois.

Salerno, R.J. et al., A Parallel, Four Degree-Of-Freedom Robotic Wrist, 1995 Design Engineering Technical Conferences vol. 1, pp. 765-771.

Wiitala, J.M. et al., Design of an Overconstrained and Dextrous Spherical Wrist, Journal of Mechanical Design, Sep. 2000, 122 (3), pp. 347-353.

* cited by examiner

TWO-AXIS NON-SINGULAR ROBOTIC WRIST

BACKGROUND

The present disclosure is directed to robotic wrists and more particularly to two-axis robotic wrists, otherwise commonly referred to as a pointing device, having a movable member such as a pointer that is movable in two axes relative to a base such as a robotic arm to which the wrist is mounted.

Robotic systems are commonly implemented to perform various manufacturing or other operations. Increasingly, such robots are required to traverse a complicated three-dimensional path at high speed with a high degree of accuracy. In these conditions, a robot having six degrees of freedom is needed to accomplish the desired motion. In practice, it may be desirable to separate these six degrees of freedom into three degrees of freedom of translation and three degrees of freedom of rotation, or orientation. The three degrees of freedom of orientation can be further divided into forearm rotation (e.g., rotation of a robotic arm) followed by articulation of a two-axis (degree of freedom) wrist carried by the forearm.

A universal joint, which is the simplest version of a two-axis wrist, exhibits locking at 90 degrees deflection and requires remote actuation away from the base (i.e., away from the robotic arm), both of which severely limit its applicability as a robotic wrist. To this end, two different classes of mechanisms comprised of the parallel combination of serial linkages have been implemented in an attempt to expand the operating capabilities of such robotic systems. One such class of mechanisms is a double universal joint (2UU) coupling that uses a parallel combination of double universal joints on common centers, where actuation takes place through the base joint of each UU chain, fixed at 90-degrees of shaft rotation relative to each other at both the base and the pointer ends. This class of mechanisms is undesirably overconstrained, which means that the component serial chains apply some of the same constraints against movement of the pointer.

One example of such a mechanism is disclosed by V. Milenkovic, "New Nonsingular Robot Wrist Design," Robots 11 Conference Proceedings RI/SME, pp. 13.29-13.42, 1987, which has a central link separating the U-joint centers. This mechanism is able to achieve symmetric deflection of the outer gimbals in each double U-joint by internal drive mechanisms that enforce contra-rotation of the inner gimbals, operating on the separation between the U-joint centers and the fixed connections between the pair of double U-joint chains at their ends. Another example, disclosed by J. M. Wiitala and M. M. Stanisic, Design of an overconstrained and dexterous spherical wrist," Journal of Mechanical Design, vol. 122, pp. 347-353, 2000, merges the inner gimbals to place each double U-joint on a common center. A spherical constraint linkage ties links connected to the inner gimbal to a floating equator ring common to the pair of double U-joints to accomplish the same goal.

The mechanism of V. Milenkovic results in a variable distance between the base and the pointer links with respect to their point of intersection on account of the offset between U-joint centers, whereas the mechanism of Wiitala and Stanisic is a pure spherical pointing device that maintains a constant distance from the sphere center. Such double U-joint pointing mechanisms limit each component U-joint to one-half the total deflection, moving the singularity to 180 degrees of deflection but are otherwise overconstrained, requiring precision manufacturing and offering substantial challenges in assembly of such systems.

Another class of mechanisms is referred to as a triple Clemens linkage (kinematic class 3RSR), which maintains a constant velocity relationship between input and output shafts (typically referred to as a constant velocity (CV) coupling), which are the base and pointer links in robotic systems, by using the parallel combination of three separate serial RSR Clemens linkages. This class of mechanisms is not overconstrained as are the 2UU mechanisms, but they require three actuator joints at the base, controlling pitch, yaw and distance of the base and pointer to their intersection center. In addition to having a redundant actuator (sometimes referred to as being overactuated because it has more actuators (3) than it has desired degrees of rotational movement (2) of the pointer), maintaining a constant distance of the pointer to the spherical center of rotation becomes a task of a computer control system.

There is a need, therefore, for a two-axis robotic wrist that is non-singular, non-overconstrained, and non-overactuated, and is more suitably also spherical, i.e., the pointer motion is spherical about its center point.

SUMMARY

In one embodiment, a robotic system having a two-axis robotic wrist generally comprises a reference member having a longitudinal axis and a movable member rotatably movable relative to the reference member. In an undeflected position of the movable member relative to the reference member, the wrist has a pitch axis transverse to the longitudinal axis of the reference member for pitch rotation of the movable member relative thereto, a yaw axis perpendicular to the pitch axis and to the longitudinal axis of the reference member for yaw rotation of the movable member relative to the reference member, and a roll axis coaxial with the longitudinal axis of the reference member.

A first serial chain linkage connects the movable member to the reference member and comprises a revolute-universal (RU) linkage having a revolute joint pivotally connecting the RU linkage to the reference member and a universal joint pivotally connecting the movable member to the RU linkage. In the undeflected position of the movable member the revolute joint has a rotation axis and is oriented such that its rotation axis is coaxial with the pitch axis of the wrist.

A second serial chain linkage connects the movable member to the reference member in a parallel relationship with the first serial chain linkage and comprises a revolute-spherical-revolute (RSR) linkage. The RU linkage is configured together with the RSR linkage such that the movable member is constrained to spherical movement about a center C defined by the intersection of the pitch axis, the yaw axis and the roll axis of the wrist. The parallel combination of the first and second serial chain linkages of the robotic wrist is free from singularities and is non-overconstrained.

In another embodiment, a robotic system generally comprises a reference member having a longitudinal axis, and a two-axis robotic wrist connected to the reference member and having a movable member movable relative to the reference member in pitch and yaw. The robotic wrist is configured to limit yaw and pitch movement of the movable member to spherical movement thereof relative to the reference member with the robotic wrist being free of singularities, being non-overconstrained, and being non-overactuated.

In yet another embodiment, a robotic system having a two-axis wrist generally comprises a reference member having a longitudinal axis, and a movable member rotatably movable relative to the reference member. In an undeflected position of the movable member relative to the reference member the movable member has a pitch axis transverse to the longitudinal axis of the reference member for pitch rotation of the movable member relative thereto, and a yaw axis perpendicular to the pitch axis and to the longitudinal axis of the reference member for yaw rotation of the movable member relative to the reference member. A first serial chain linkage connects the movable member to the reference member and a second serial chain linkage connects the movable member to the reference member in parallel relationship with the first serial chain linkage. The first and second serial chain linkages are configured such that the robotic system is free from singularities, is non-overconstrained, and wherein the first and second serial chain linkages define an intersecting-shaft constant velocity coupling between the reference member and the movable member.

Other features of the invention will be in part apparent and in part pointed out hereinafter.

BRIEF DESCRIPTION OF DRAWINGS

Corresponding reference characters indicate corresponding parts throughout the several views of the drawings.

DETAILED DESCRIPTION OF THE EXEMPLARY EMBODIMENTS

Figure 1:
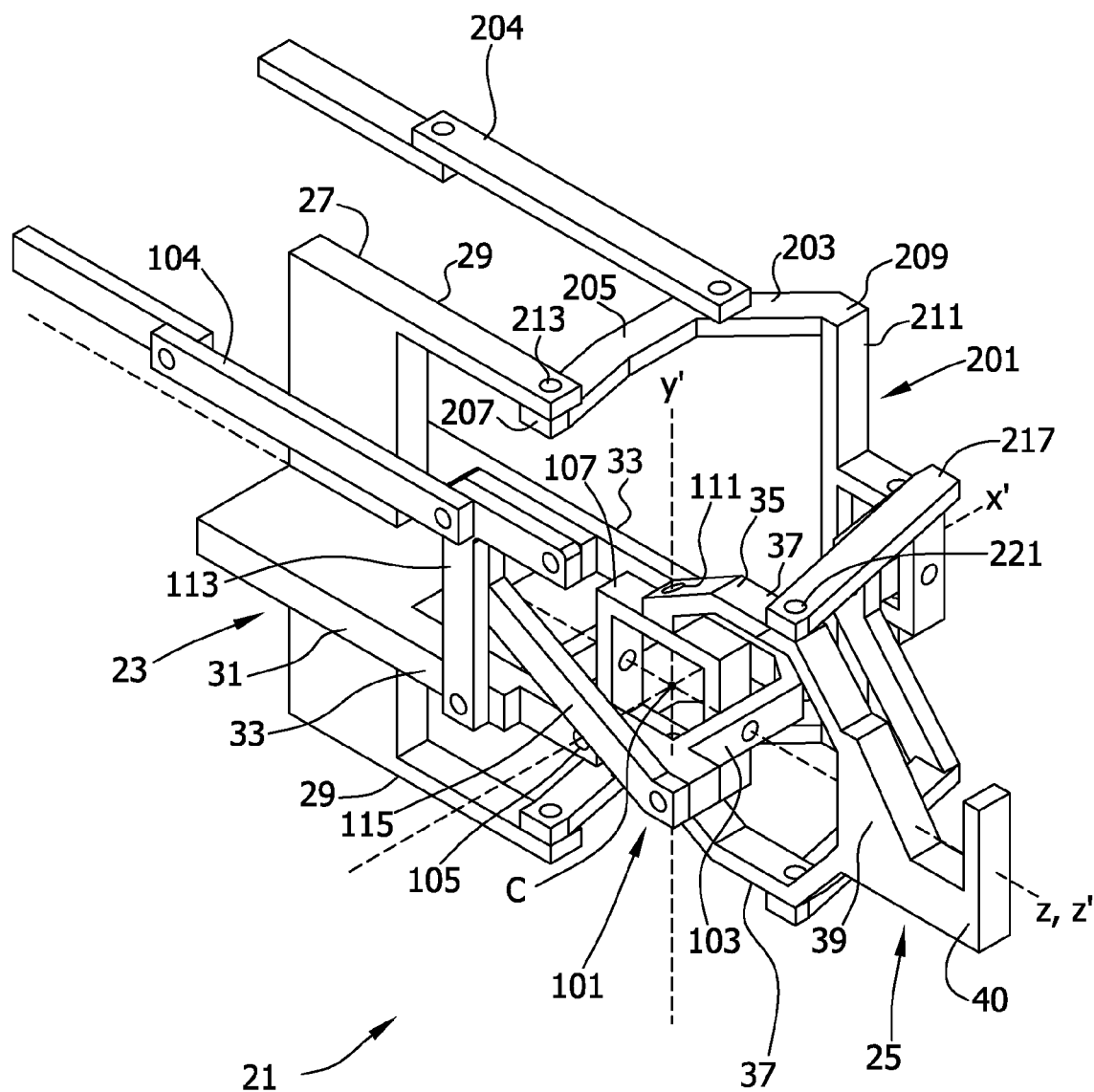
FIG. 1 is a perspective view of one embodiment of a spherical movement robotic wrist coupled to a base and having a pointer capable of two-axes of movement, pitch and yaw, with the pointer illustrated in an undeflected position (i.e., zero degrees of pitch and zero degrees of yaw)

With reference now to the drawings and in particular to FIG. 1, a robotic wrist according to one embodiment is generally indicated at 21 and is illustrated as being connected to a base (broadly, a reference member), which is generally indicated at 23. The base 23 may be a stationary structure but is more suitably mounted on or otherwise forms a forearm part of a robotic arm (not shown) that is capable of translational movement at least longitudinally of the arm and more suitably in three translational degrees of freedom, as well as in some embodiments rotation on a single axis (e.g., roll movement).

The illustrated base 23 thus has a longitudinal axis Z indicative of the longitudinal axis of a robotic arm along which longitudinal (e.g., fore and aft) movement of the robotic wrist 21 may occur conjointly therewith. This longitudinal axis Z of the base 23 also defines the roll axis of the robotic arm. In the illustrated embodiment, the robotic wrist 21 is suitably configured such that it is driven only in yaw and pitch (with roll deflection particular to that yaw and pitch being constrained to a constant velocity relationship of the wrist as discussed later herein) and is thus considered herein as a two-axis wrist (i.e., yaw and pitch). A pointer 25 (broadly, a movable member), is operatively connected to the base 23 for rotational movement relative thereto (e.g., driven yaw and pitch deflection and resultant roll deflection) as described in further detail later herein.

The base 23 illustrated in FIGS. 1-17 suitably comprises two forks, one being referred to herein as a yaw fork 27 having a pair of vertically spaced fork members 29 and defining a generally vertical plane, and a pitch fork 31 having a pair of transversely spaced fork members 33 that define a transverse plane perpendicular to the plane defined by the yaw fork members. The yaw fork 27 and pitch fork 31 are attached (e.g., fixed) to each other for conjoint movement with any movement of the robotic arm (i.e., the base 23) or for stationary positioning as a fixed assembly. It is understood, however, that the base 23 may be constructed other than as illustrated without departing from the scope of this invention.

Figure 2:
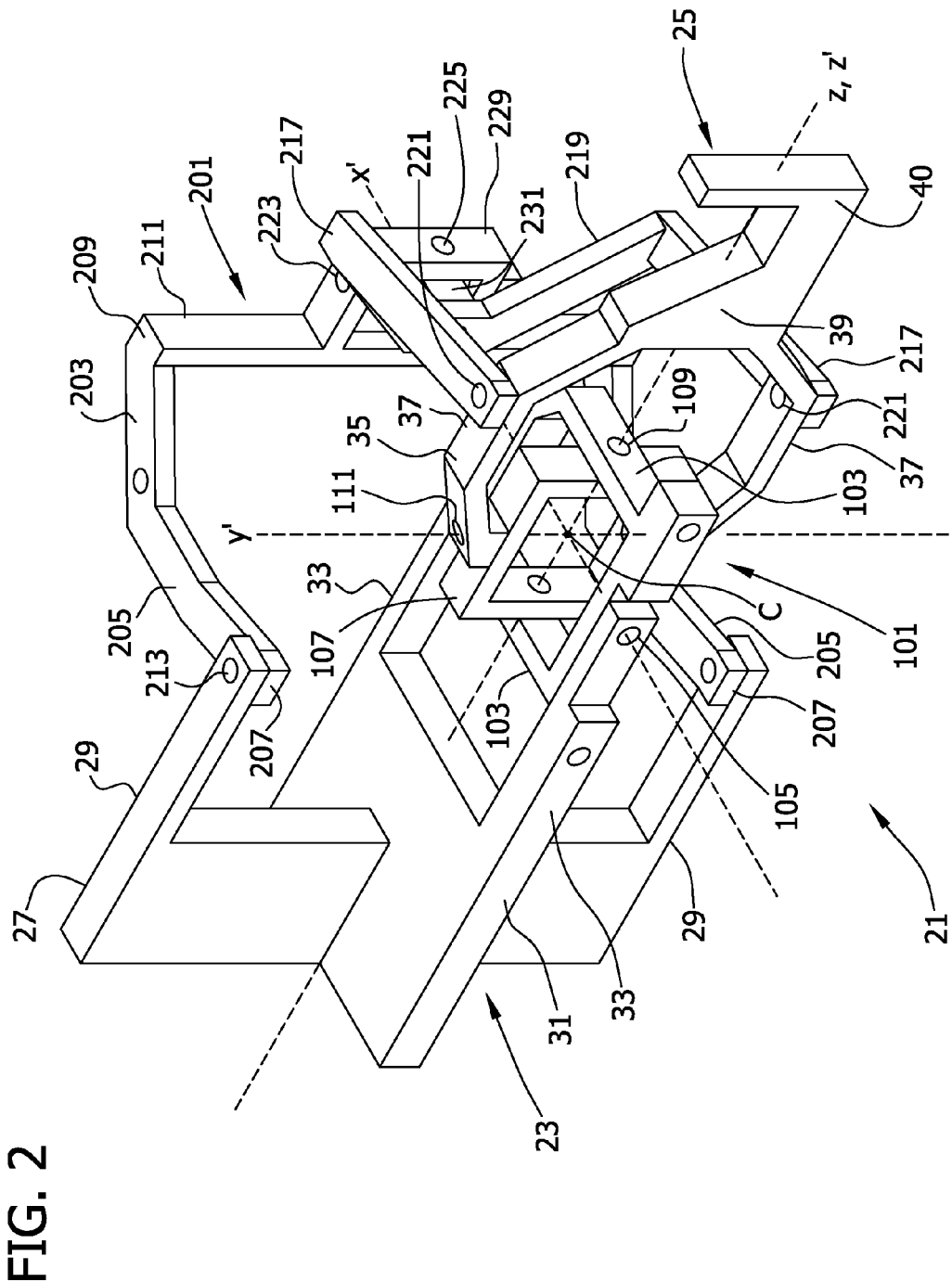
FIG. 2 is a partial assembly of the robotic wrist of FIG. 1 with yaw and pitch actuation pushrods removed.

As best seen in FIG. 2, the pointer 25 (i.e., the movable member) of the robotic wrist 21 includes a fork 35 having vertically spaced, generally arcuate fork members 37 and a central span 39 extending vertically between and interconnecting the fork members. A finger 40 extends outward from the central span. It is understood, however, that the configuration of the pointer 25 is generally a function of its intended use and the need to reduce the occurrence of interferences between the pointer and other structural components of the robotic arm and wrist 21. Accordingly, the pointer 25 may be configured other than as illustrated in FIG. 1 and remain within the scope of this invention.

FIG. 1 illustrates the robotic wrist 21 in what is referred to herein as an undeflected position of the pointer 25, with the central span 37 of the pointer 25 extending vertically with the pointer finger 40 generally lying on or at least parallel to the longitudinal axis Z of the robotic arm. That is, the span 37 of the pointer 25 lies in a plane defined by the longitudinal axis Z and a reference yaw axis Y' of the robotic wrist 21 in the undeflected position of the pointer. A reference pitch axis X' of the robotic wrist 21 extends perpendicular to both the longitudinal axis Z of the robotic arm and the reference yaw axis Y' of the wrist (and hence to the span 37 of the pointer 25) in the undeflected position of the pointer. Also in the undeflected position of the pointer 25, a reference roll axis Z' of the wrist 21 is parallel to and more suitably coaxial with the longitudinal axis Z of the base 23 (i.e., of the robotic arm). In the illustrated embodiment of FIG. 1, the yaw deflection and pitch deflection (as well as roll deflection) of the wrist 21 relative to the base 23 are each zero degrees. Though it is understood that in other embodiments the undeflected position of the pointer 25 may be angled in yaw and/or pitch relative to the base 23 within the scope of this invention.

The pointer 25 is operatively connected to the base 23 by a parallel mechanism, which as used herein refers to a plurality of serial chain linkages, arranged in parallel with each other, that broadly connect a movable member such as the pointer 25 to a reference member such as the base 23. For example, the pointer 25 of the embodiment of FIGS. 1-17 is operatively connected to the base 23 by a pair of serial chain linkages, referred to broadly herein as a first serial chain linkage, generally indicated at 101, and a second serial chain linkage, generally indicated at 201. The first serial chain linkage 101 in accordance with one particularly suitable embodiment broadly comprises a spherical (S) linkage that operatively connects the pointer 25 to the pitch fork 31 of the base 23 and the second serial chain linkage 201 in accordance with such an embodiment broadly comprises a revolute-spherical-revolute (RSR) linkage that operatively connects the pointer to the yaw fork 27 of the base in parallel relationship with the spherical (S) linkage of the first serial chain linkage.

Figure 3:
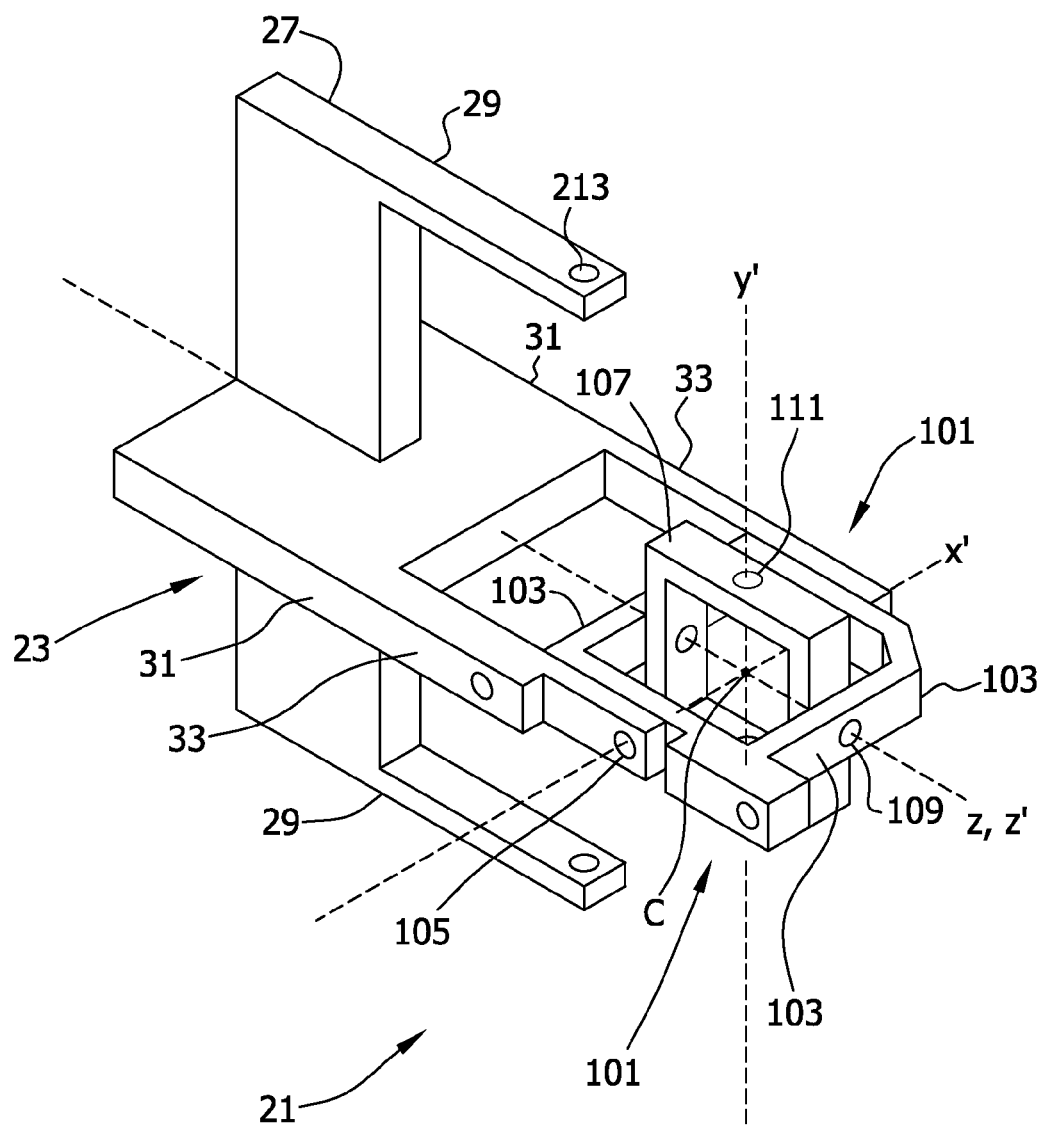
FIG. 3 is a partial assembly of the robotic wrist of FIG. 1 illustrating elements of a revolute-universal (RU) serial chain linkage thereof.
Figure 4:
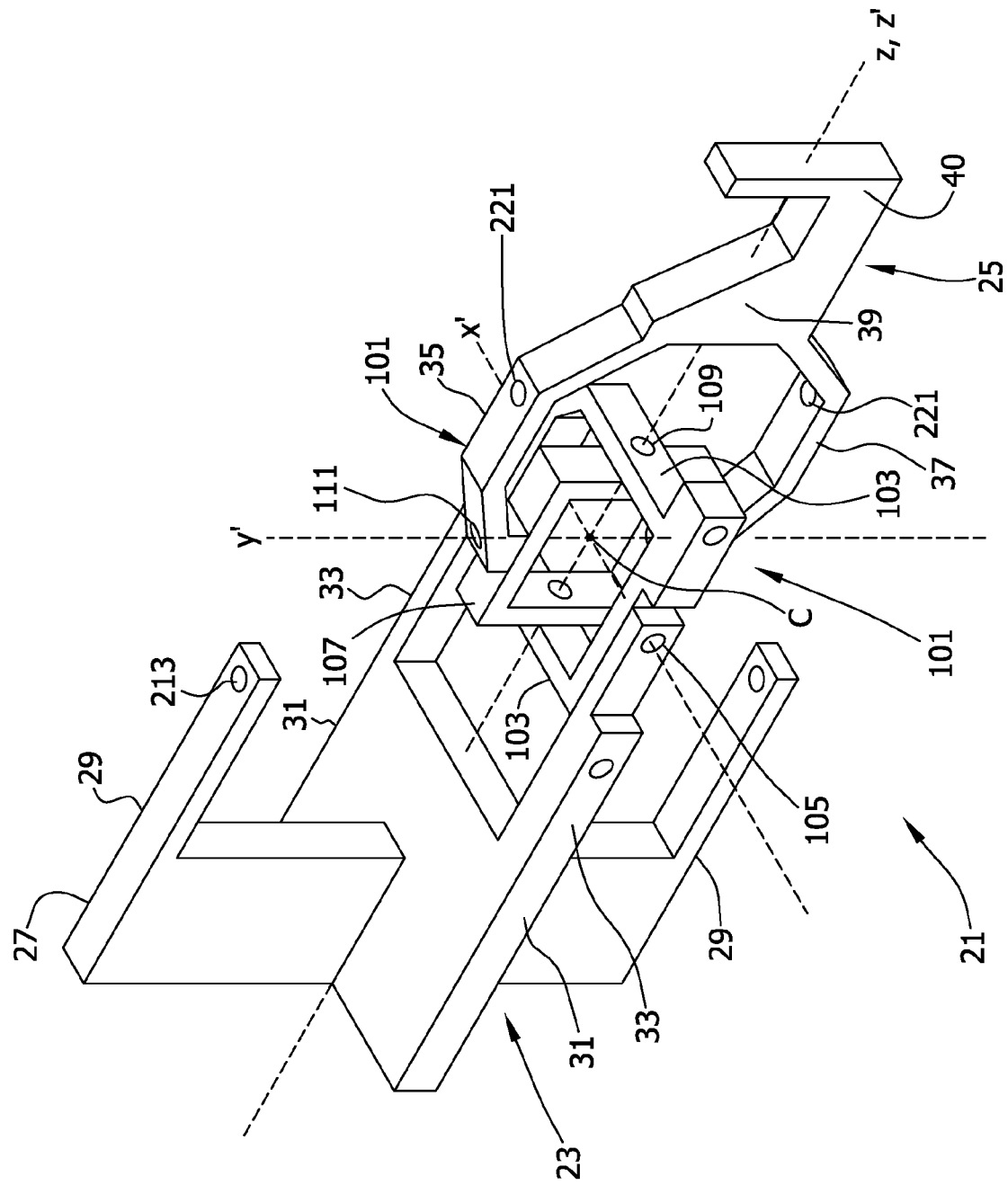
FIG. 4 is a partial assembly of the robotic wrist of FIG. 1 illustrating the entire RU serial chain linkage thereof.
Figure 5:
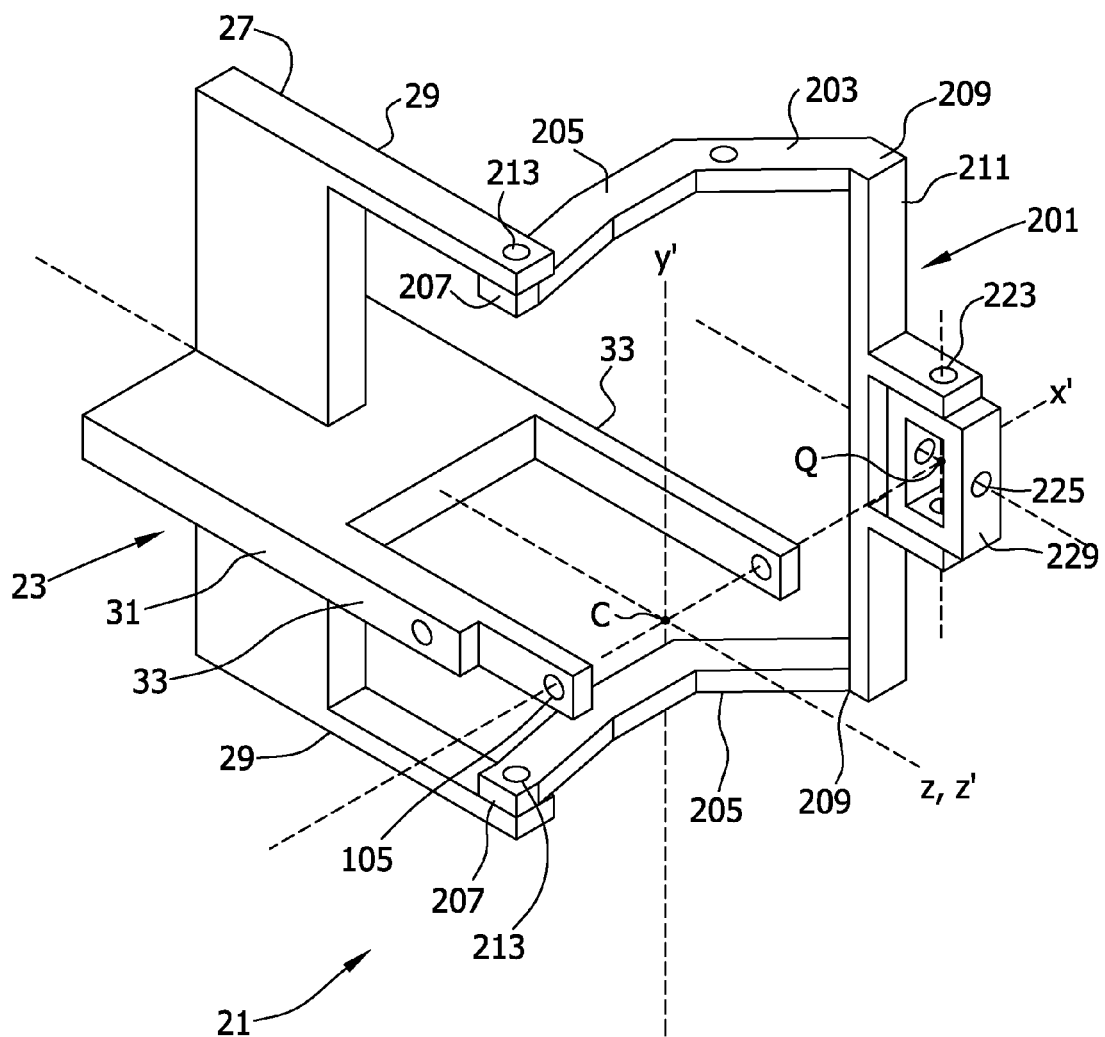
FIG. 5 is a partial assembly of the robotic wrist of FIG. 1 illustrating elements of a revolute-spherical-revolute (RSR) serial chain linkage thereof.
Figure 6:
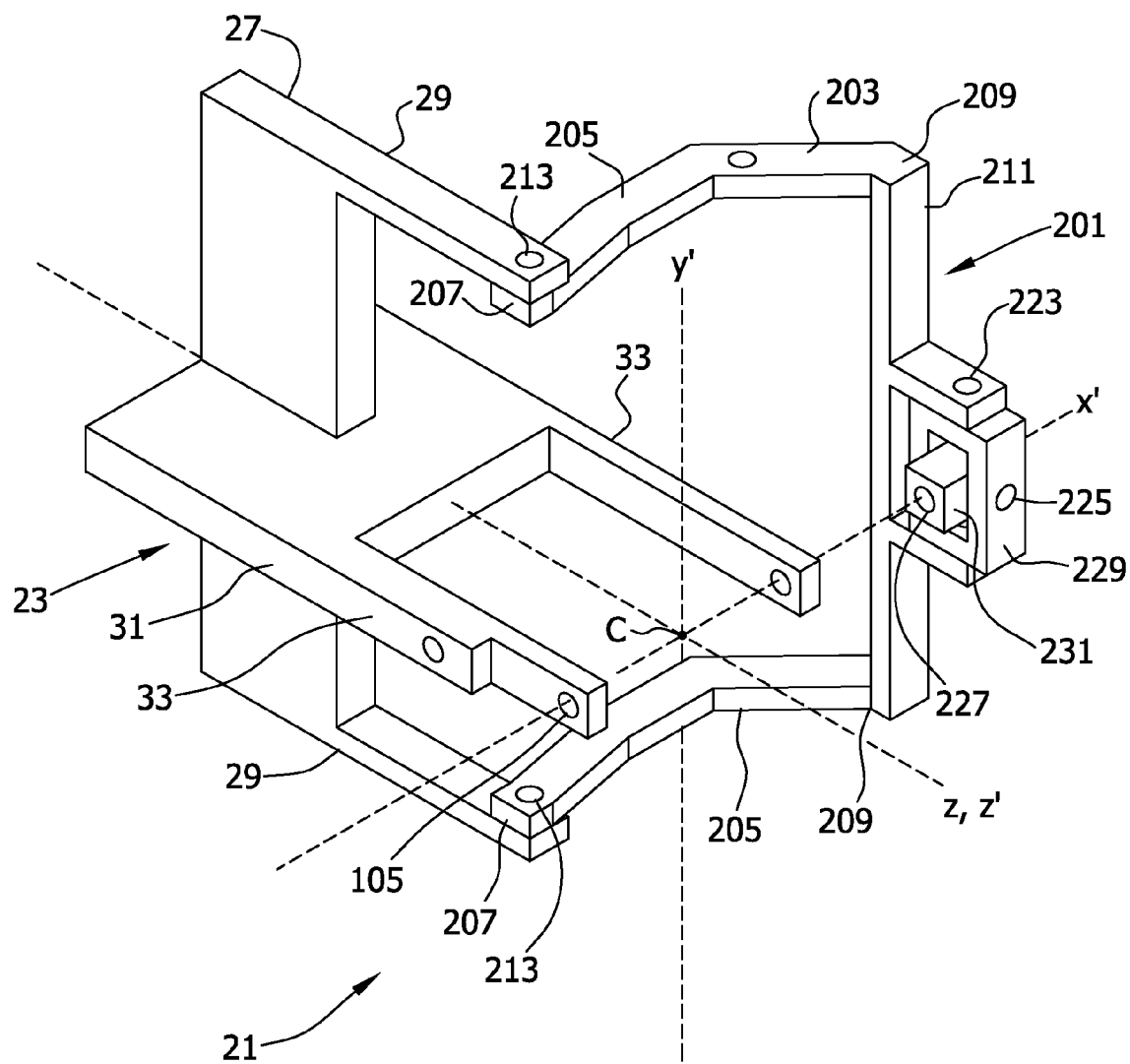
FIG. 6 is a partial assembly similar to FIG. 5 illustrating additional elements of the RSR serial chain linkage.
Figure 7:
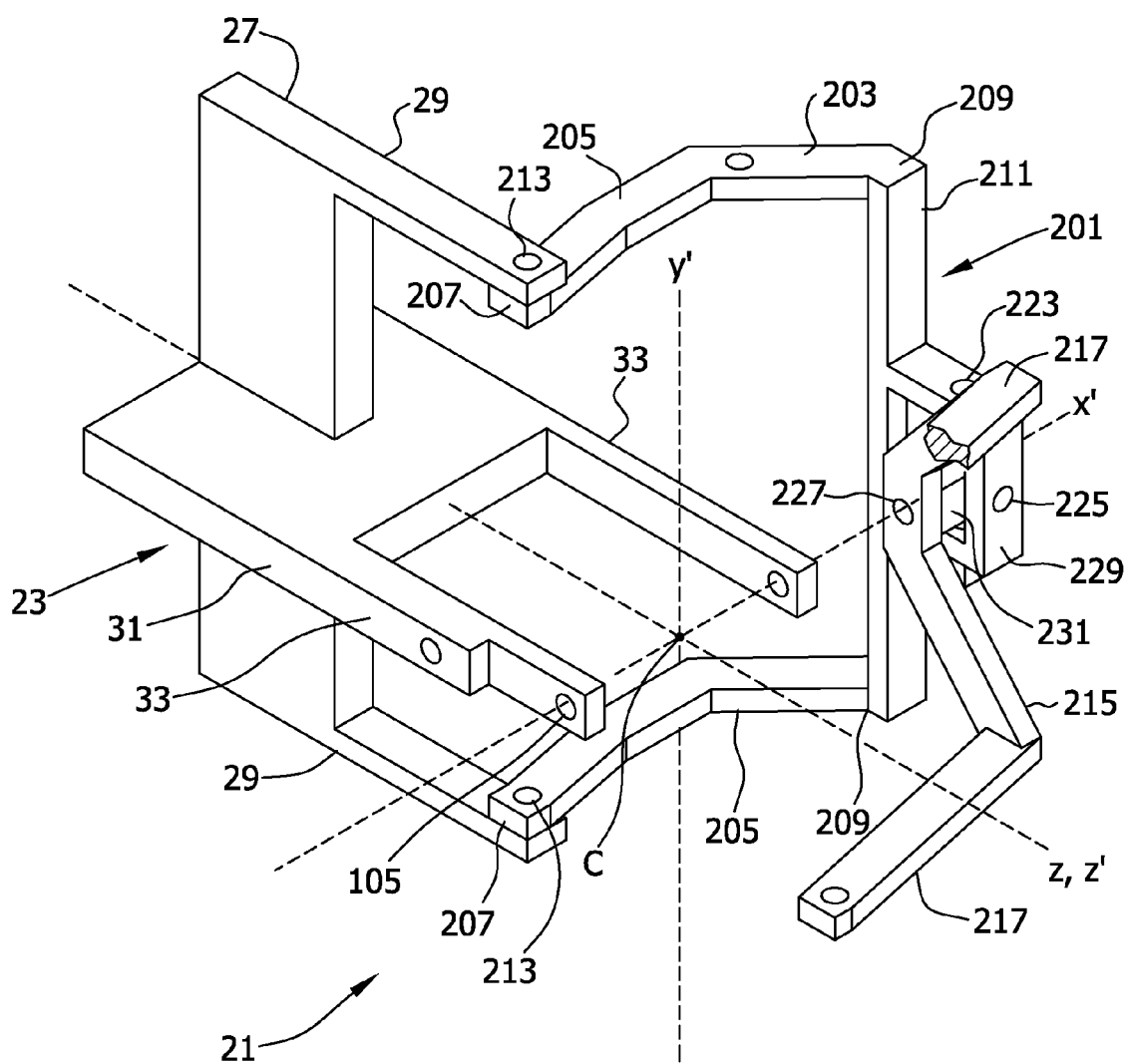
FIG. 7 is a partial assembly similar to FIG. 6 illustrating further additional elements of the RSR serial chain linkage.
Figure 8:
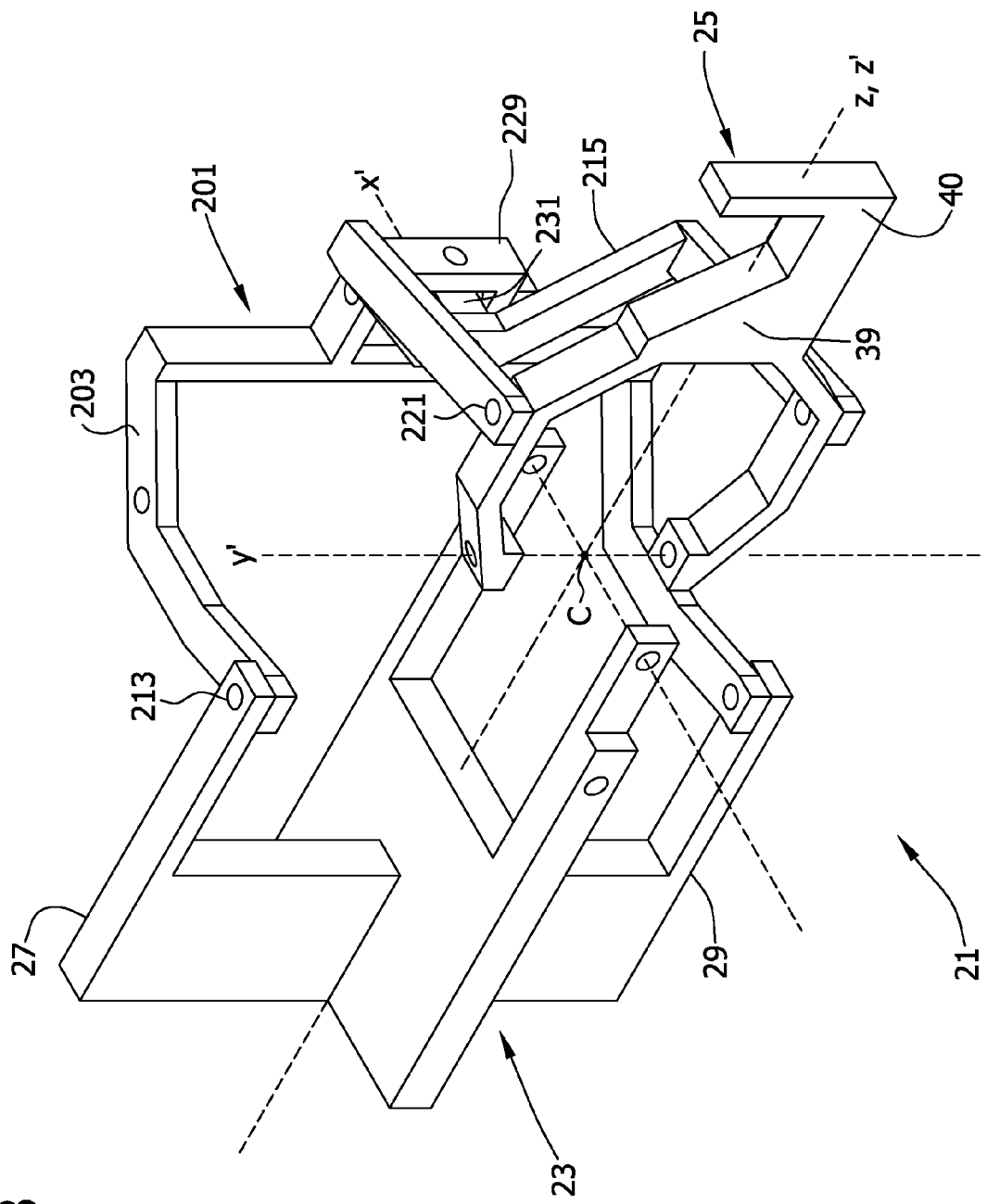
FIG. 8 is a partial assembly similar of the robotic wrist of FIG. 1 illustrating the entire RSR serial chain linkage.

With particular reference to FIGS. 2-4, the spherical (S) linkage 101 comprises a series of three revolute (RRR) joints 105, 109, 111 with the rotation axes of these three joints having a common center C and defining the pitch axis X', yaw axis Y' and roll axis Z' of the wrist 21 in the undeflected position of the pointer 25. More suitably, these three revolute joints 105, 109, 111 are formed by a pair of links 103, 107 (in addition to and serially intermediate the base 23 and the pointer 25, which are also considered links), each in the form of what is referred to herein as a cage link (i.e., a generally rectangular or square frame-shaped member). The use of cage links provides the wrist 21 with a relatively high degree of stiffness. It is understood, however, that one or both of the links used to construct the spherical (S) linkage 101 may be other than a cage link without departing from the scope of this invention.

The first link 103, referred to further herein as the pitch rotor, lies horizontally in the plane defined by the pitch fork members 33 of the base 23. The pitch rotor 103 is pivotally connected to the pitch fork members 33 of the base 23, such as by bearings or other suitable pivot members including without limitation pins, rods, hinges and the like, to allow pivoting (e.g., rotational) movement of the pitch rotor relative to the base. Connection of the pitch rotor 103 to the base 23 in this manner defines the first revolute joint 105 of the spherical (S) linkage and has a rotation axis that is transverse to the longitudinal axis Z of the robotic arm (and hence the roll axes Z' of the wrist 21) in the undeflected position of the pointer 25. More particularly, the rotation axis of this first revolute joint 105 defines the reference pitch axis X' of the wrist—about which the pointer 25 moves in pitch deflection relative to the base 23 with the pointer undeflected in yaw as seen best in FIGS. 13-16.

The second link 107, which is referred to further herein as the pitch spider, is oriented generally vertically in the undeflected position of the pointer 25 to lie generally in the plane that includes the longitudinal axis Z of the base 23 and the yaw fork members 29 in the undeflected position of the pointer. The pitch spider 107 is pivotally connected to the pitch rotor 103 to define the second revolute joint 109. This second revolute joint 109 has a rotation axis that is both coaxial with the longitudinal axis Z of the robotic arm and defines the reference roll axis Z' of the wrist 21 in the undeflected position of the pointer 25.

The pointer 25, and more particularly the fork members 37 thereof in the illustrated embodiment, is pivotally connected to the pitch spider 107 to define the third revolute joint 111 of the spherical (S) linkage 101 of the robotic wrist 21. This third revolute joint 111 defines the reference yaw axis Y' of the wrist in the undeflected position of the pointer 25. Because the rotation axes X', Y', Z' of the spherical (S) linkage 101 share a common center C and the pointer 25 is constrained by connection of the spherical (S) linkage to the pitch fork 31 against translational movement independent of the base 23, the pointer 25 is suitably limited to spherical movement about the center C of the spherical (S) linkage 101. Accordingly, the pointer 25 in this embodiment is properly referred to as a spherical pointer in which the movable member is constrained to the three degrees of spherical motion.

In the illustrated embodiment, the second and third revolute joints 109, 111 (defined respectively by connection of the pitch spider 107 to the pitch rotor 103 and by the pointer 25 to the pitch spider) act in the manner of a single universal (U) joint. As such, the spherical (S) linkage 101 (i.e., the first serial chain linkage) may more suitably be referred to as comprising a revolute-universal (RU) joint. The purpose of the initial revolute (R) joint 105 (joining the pitch rotor 103 with the pitch fork 31) is to allow for pitch movement of the wrist by a suitable actuator (not shown) that drives rotation of the pitch rotor. The general purpose of the serial universal (U) joint is to couple pitch motion of the pitch rotor relative to the base pitch fork members to a yaw deflected axis of pitch rotation of the pointer fork as described in further detail later herein.

With particular reference now to FIGS. 5-8, the RSR linkage of the second serial chain linkage 201 more suitably comprises what is often referred to as an RSR Clemens linkage. This linkage 201 in one embodiment comprises a yaw crank 203 that includes a pair of vertically spaced arms 205 each having a proximal end 207 pivotally connected to a respective one of the base yaw fork members 29, and a distal end 209. A connecting span 211 extends vertically between and interconnects the distal ends 209 of the yaw crank arms 205. In this configuration, the pivot connection of the yaw crank arms 205 to the yaw fork members 29 of the base 23 defines a revolute joint 213, and in this instance the first revolute (R) joint of the RSR Clemens linkage 201. While in the illustrated embodiment the yaw crank arms 205 and connecting span 211 of the yaw crank 203 are formed integrally with each other, it is understood that the yaw crank arms and span may be formed separate from and secured to each other by adhesive, mechanical fastening or other suitable means of securement. The revolute joint 213 defined by this connection has a rotation axis (not shown) that is parallel to but otherwise offset longitudinally a distance b (see the schematic illustration in FIG. 21) from the reference yaw axis Y' of the wrist and spherical center C of the spherical (S) linkage of the first serial chain linkage 101 in the undeflected positioned of the pointer 25.

A yaw coupler 215 of the RSR Clemens linkage 201 comprises a pair of vertically spaced coupler arms 217 interconnected by a suitable vertically oriented connecting span 219 disposed at the proximal ends of the coupler arms. The yaw coupler 215 is pivotally connected to the fork members 37 of the pointer 25 to define the second revolute (R) joint 221 of the RSR Clemens linkage 201. The pivot connection of this second revolute joint 221 has a rotation axis (not shown) that is parallel to and longitudinally offset a distance b (see the schematic illustration in FIG. 20) from the reference yaw axis Y' of the wrist 21 and the center C of the spherical (S) linkage of the first serial chain linkage 101 in the undeflected position of the pointer 25.

Accordingly, reference yaw axis Y' of the wrist 21 (and center (C) of the spherical (S) linkage of the first serial chain linkage 101) is disposed longitudinally between the rotation axes of the first revolute joint 213 and the last revolute joint 221 of the RSR Clemens linkage 201 in the undeflected position of the pointer 25. The second revolute joint 221 allows yaw rotation of the pointer 25 relative to the yaw coupler 215 in response to driven rotation of the yaw crank 203 relative to the base 23.

The yaw crank 203 and the yaw coupler 215 of the RSR Clemens linkage 201 are operatively connected to each other by the serially intermediate spherical (S) joint of the RSR Clemens linkage. In the illustrated embodiment, this spherical (S) joint is suitably defined by a series of three revolute joints 223, 225, 227 in which their respective rotation axes share a common center Q. For example, with continued reference to FIGS. 5-7, these revolute joints 223, 225, 227 are formed by a pair of links 229, 231 (in addition to and serially intermediate the yaw crank 203 and the yaw coupler 215, which are also links), each in the general form of a cage link. The first link 229, otherwise referred to further herein as the yaw spider, is pivotally connected to the connecting span 211 of the yaw crank 203 to define the first revolute (R) joint 223 of the RSR spherical (S) joint. This first revolute joint 223 has a rotation axis parallel to the reference yaw axis Y' of the wrist 21 in the undeflected position of the pointer 25.

The second link 231, otherwise referred to further herein as the yaw rotor, is pivotally connected to the yaw spider 229 to define the second revolute (R) joint 225 of the RSR spherical (S) joint. This second revolute joint 225 has a rotation axis that is parallel to and transversely offset along the reference pitch axis X' a distance c (see the schematic illustration in FIG. 21) from the longitudinal axis Z of the robotic arm (and hence from the reference roll axis Z' of the robotic wrist 21 and the center C of the spherical (S) linkage of the first serial chain linkage 101) in the undeflected position of the pointer 25.

The third revolute (R) joint 227 of the RSR spherical (S) joint is defined by pivotally connecting the yaw coupler 215 to the yaw spider 231 for rotation on an axis that is parallel to and more suitably coaxial with the reference pitch axis X' of the wrist 21 in the undeflected position of the pointer 25. This revolute joint 227 is suitably free to rotate in excess of plus or minus 90 degrees to facilitate pitch rotation in that amount. The other revolute joints 223, 225 of the spherical joint of the RSR linkage 201 may but need not necessarily be capable of a lesser degree of rotation on their respective axes.

The revolute (R) joint 227 having a rotation axis coaxial with the reference pitch axis X' of the wrist 21 in the illustrated embodiment is suitably the third revolute joint of the spherical (S) link of the RSR Clemens linkage 201. However, it is understood that in an alternative embodiment (not shown) it may be the first revolute joint 223 (instead of the third revolute joint 227) of the spherical link of the RSR Clemens linkage 201 that has a rotation axis coaxial with the reference pitch axis X' of the wrist 21 in the undeflected position of the pointer 25.

Figure 21:
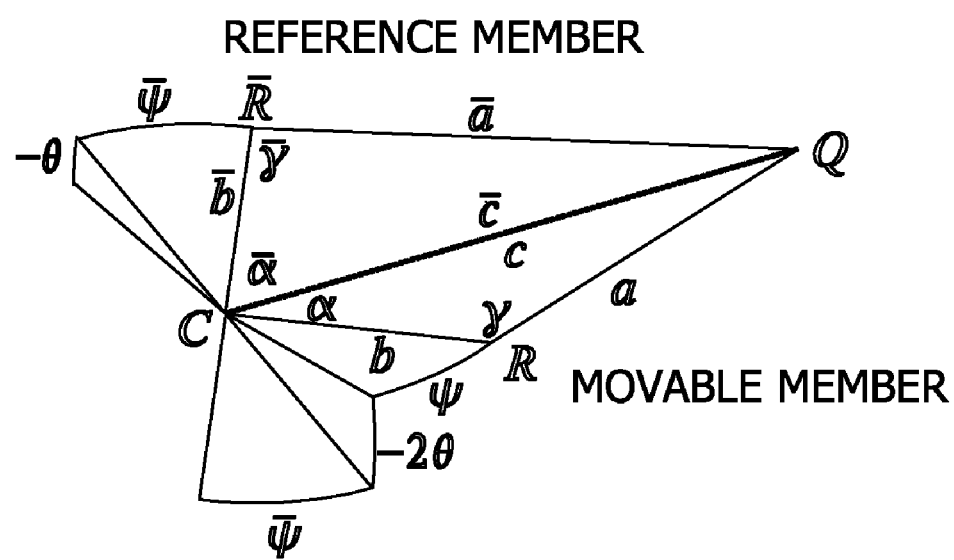
FIG. 21 is a schematic of triangles illustrating symmetric actuation of the robotic wrist of FIG. 1 in both yaw and pitch.

While not shown in the illustrated embodiments, it is contemplated that the spherical (S) joint of the RSR Clemens linkage 201 may instead be provided by a ball-in-socket member fixed to the connecting span 219 of the yaw crank 203, and with the yaw coupler 215 connected to the movable ball of the ball-in-socket member. In such an embodiment, the pitch axis of the ball-in-socket member is still suitably coaxial with the pitch axis X' of the wrist 21 in the undeflected position of the pointer 25. In either embodiment, both the common center Q of the spherical joint of the RSR Clemens linkage 201 and the common center C of the spherical joint of the RU linkage 101 lie on the reference pitch axes X' of the wrist 21 in transversely spaced relationship with each other (e.g., a distance c as illustrated in FIG. 21). The distance therebetween provides a long moment arm for torsional stiffness of the parallel mechanism.

The RSR linkage 201 thus has five degrees of freedom and adds one degree of constraint by being arranged in parallel with the RU linkage 101. In this manner, of the three spherical degrees of freedom allowed by the RU linkage 101, pitch and yaw deflection of the pointer 25 may be controlled by actuators as discussed below, but the roll deflection of the pointer is constrained to a value dependent of the amount of pitch and yaw deflection. That is, operation of the robotic wrist 21 to drive movement of the pointer 25 relative to the base 23 is effected by only two actuating systems, i.e., one corresponding to each of the yaw and pitch axes of rotation of the wrist. As such, the illustrated robotic wrist 21 is not "overactuated," which as used herein refers to a system in which the number of actuating systems used exceeds the intended number of rotational axes of movement of the pointer.

In particular, a yaw actuating system (not shown) operatively connects the yaw crank 203 to the robotic arm (e.g., to the base 23), such as in the form of one or more pushrods 204 or other suitable actuators (along with their respective drive motor(s)) connected to one or both arms 205 of the yaw crank. The yaw actuating system is operable to drive rotation of the yaw crank 203 relative to the base 23 about the rotation axis defined by the revolute joint 213 formed by the pivot connection of the yaw crank to the base (i.e., by the first revolute (R) joint in the RSR Clemens linkage 201). Rotation of the yaw crank 203 effects yaw rotation of the pointer 25 about the reference yaw axis Y' of the wrist 21 (e.g., as defined by the revolute joint 111 at which the pointer is connected to the first serial chain linkage 101).

A pitch actuating system (not shown) operatively connects the pitch rotor 103 (and hence the pointer 25) to the robotic arm (e.g., to the base 23), such as in the form of one or more pushrods 104 or other suitable actuating systems (along with their respective drive motor(s)) operatively connected to the pitch rotor. In the illustrated embodiment, operative connection of the pitch rotor 103 to the robotic arm is more suitably achieved by a scissor link, one member of which is referred to herein as a pitch crank 113 that is pivotally connected at a fixed end thereof to the base 23, and more particularly to one of the pitch fork members 33 of the base. The other scissor link member is referred to herein as a pitch coupler 115 that is pivotally connected to the pitch rotor 103 and also pivotally connected to the pitch crank 113. The pitch actuating system is operatively connected (e.g., via push rods 104 in the illustrated embodiment) to the pitch crank 113 and is operable to drive rotation of the pitch crank relative to the base 23.

In this configuration, the combination of the base 23, pitch crank 113, pitch coupler 115 and pitch rotor 103 (and more broadly, the pointer 25) suitably defines a generally planar four-bar linkage to facilitate actuation of the pointer in pitch. It is understood, however, that the pitch crank 113 and pitch coupler 115 may be oriented other than as illustrated without departing from the scope of this invention.

This four-bar linkage configuration accorded by using the pitch crank 113 and pitch coupler 115 to actuate the pitch rotor acts as a pitch rotation angle reducer, so that the pitch rotor 103 (and hence the pointer 25) may be actuated in pitch up to plus or minus 100 degrees without creating dead zones on the pitch actuating system driven from the robotic arm (e.g., from the base 23). It is understood, however, that other actuating systems may be used to actuate the pitch rotor 103 including, without limitation, a gear train, a tensioned chain drive or other suitable actuating system. It is also contemplated that instead of an actuating system being mounted on the robotic arm (e.g., the base 23), it may instead be mounted on the universal (U) joint and more particularly on the pitch spider 107, and operatively connected to the pitch rotor 103, without departing from the scope of this invention.

Figure 18:
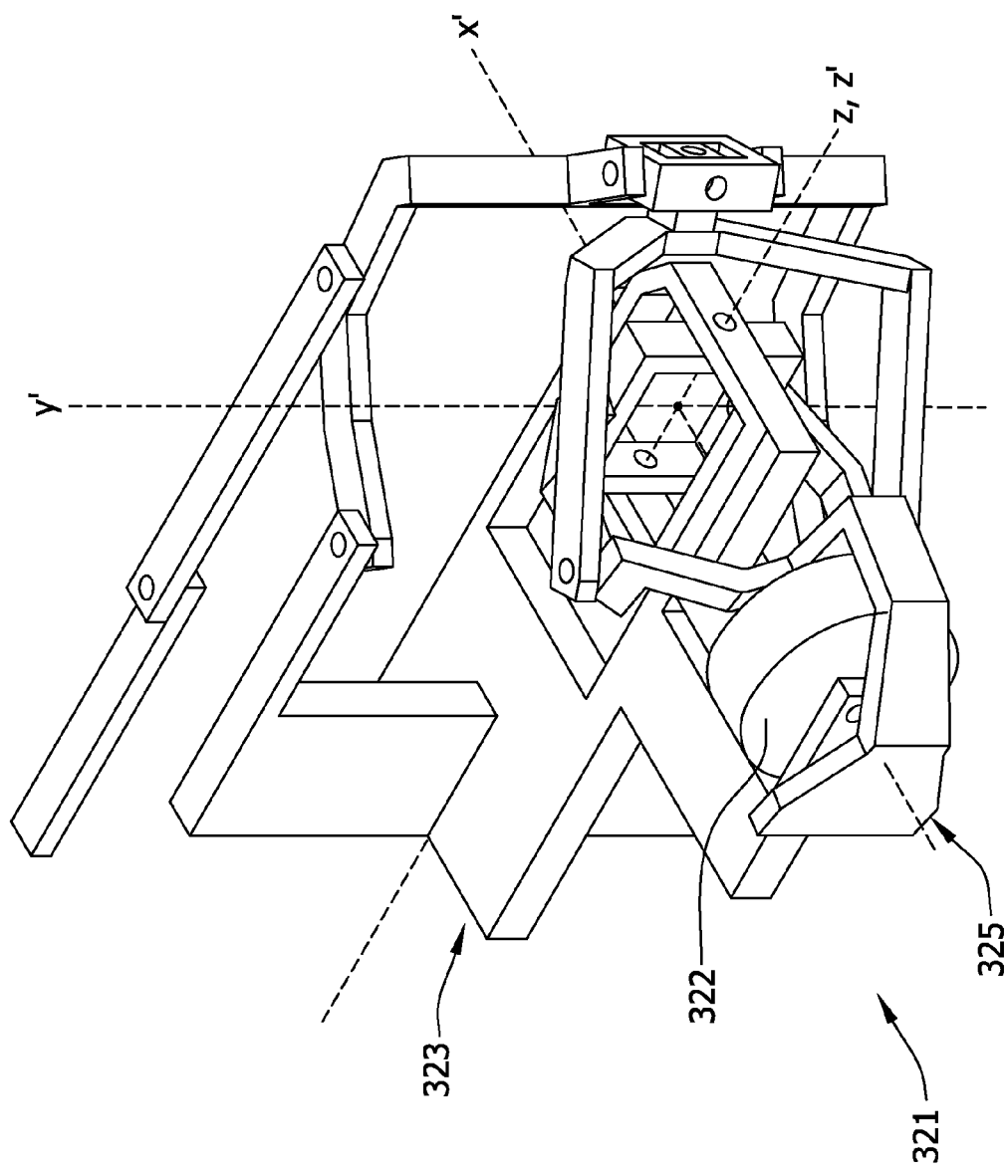
FIG. 18 is a perspective view of an alternative embodiment of robotic wrist coupled to a base and having a pointer capable of two-axes of movement, pitch and yaw, with the pointer of the wrist deflected in yaw an angle of −100 degrees relative to the undeflected position of the pointer, the pitch deflection of the pointer being zero degrees.
Figure 19:
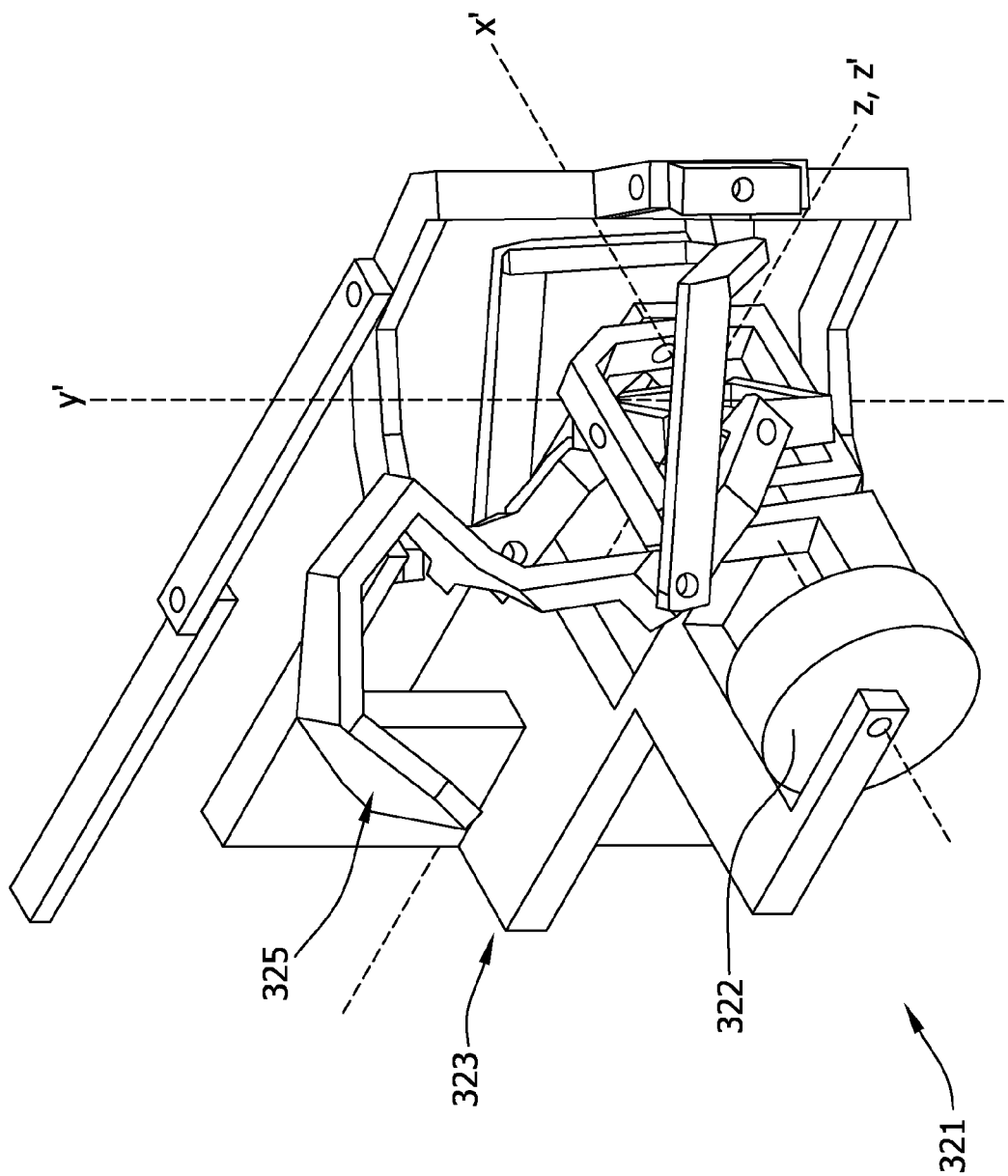
FIG. 19 is a perspective view similar to FIG. 18 with the pointer of the wrist deflected in both yaw and in pitch by the actuator pushrod displacements depicted in FIG. 10 and FIG. 14 but occurring at the same time.

As one example, FIGS. 18 and 19 illustrate a second embodiment of a robotic wrist 321 that is substantially similar to that of the first embodiment of FIG. 1, but with a drum 322 rotatably mounted to one of the base pitch fork members in place of the pushrods 104 of the embodiment of FIG. 1. The drum 322 may be suitably actuated by a motor (e.g., an electric or hydraulic motor that may in one embodiment be enclosed by the drum), a gear train from a motor disposed at another location on the wrist 321 or the base 323, a belt, a tensioned chain drive acting on the drum, or other suitable actuating mechanism. In this second embodiment, the pointer 325 is configured different from the pointer 25 of the first embodiment to avoid interferences of the pointer with the drum and associated mounting structure throughout the desired range of yaw and pitch deflection of the pointer. For example, FIG. 18 illustrates the pointer 325 at a yaw deflection of −100 degrees, and FIG. 19 illustrates the pointer after full-stroke deflections of both the yaw and pitch pushrods in combination, which would produce a yaw deflection of −100 degrees or a pitch deflection of −100 degrees if taken in separately.

Arranging the RSR linkage chain 201 in parallel series with the first serial chain linkage 101 (and in particular the RU linkage thereof) with the pitch rotor 103 being the first revolute joint 105 of the RU linkage suitably constrains the wrist 21 against roll movement other than that due to the input yaw and pitch deflections and caused by the interrelationships between the RSR linkage and the RU linkage. Thus, the pointer (i.e., the movable member) of the illustrated wrist is limited to actuation in just two-axes, i.e., pitch and yaw in the illustrated embodiment, and is constrained to spherical movement. Such an arrangement also provides (by geometric and mathematical reasoning) a wrist 21 that is free of singularities and is non-overconstrained (apart from the use of paired bearings at the various joints) up to a pointer deflection of at least 100 degrees in any direction and more suitably up to 180 degrees in any direction from the center C.

As used herein in reference to a parallel mechanism such as in the illustrated embodiment that connects a movable member (e.g., the pointer 25) to a fixed base (e.g., a reference member) through a plurality of serial chain linkages 101, 201, the term "overconstrained" refers to a construction in which the serial chain linkages apply one or more of the same constraints against movement of the movable member. Overconstrained systems typically require precision manufacturing and present challenges in assembling the system, while "non-overconstrained" systems such as the present embodiment do not have such restrictions.

Another result of using the RU linkage 101 as the spherical (S) joint of the first serial chain linkage (with the rotation axis of the first revolute (R) joint 105 defining the wrist reference pitch axis X' in the undeflected position of the pointer) in parallel with the RSR Clemens linkage 201 is that the shaft-deflection angle of the U-joint is only one-half of the total pointer 25 yaw deflection angle. The input shaft alignment to the U-joint is along the reference pitch axis X', and the effective output shaft alignment to the U-joint is along an axis connecting spherical center C of the RU linkage with spherical center of the RSR linkage. That is, upon driving rotation of the yaw crank 203 to effect yaw of the pointer 25, the effective output shaft deflection of the U-joint along an axis connecting the two spherical centers is one-half of the output yaw deflection of the pointer on account of the symmetric geometric relationship of the RSR Clemens linkage 201. For example, if the pointer is deflected (e.g., by pivoting or rotating the yaw crank relative to the base) 90 degrees in yaw, the shaft deflection angle seen by the U-joint is only 45 degrees. Moreover, the U-joint can spin around in pitch a full 180 degrees in either direction without encountering the U-joint singularity.

Figure 9:
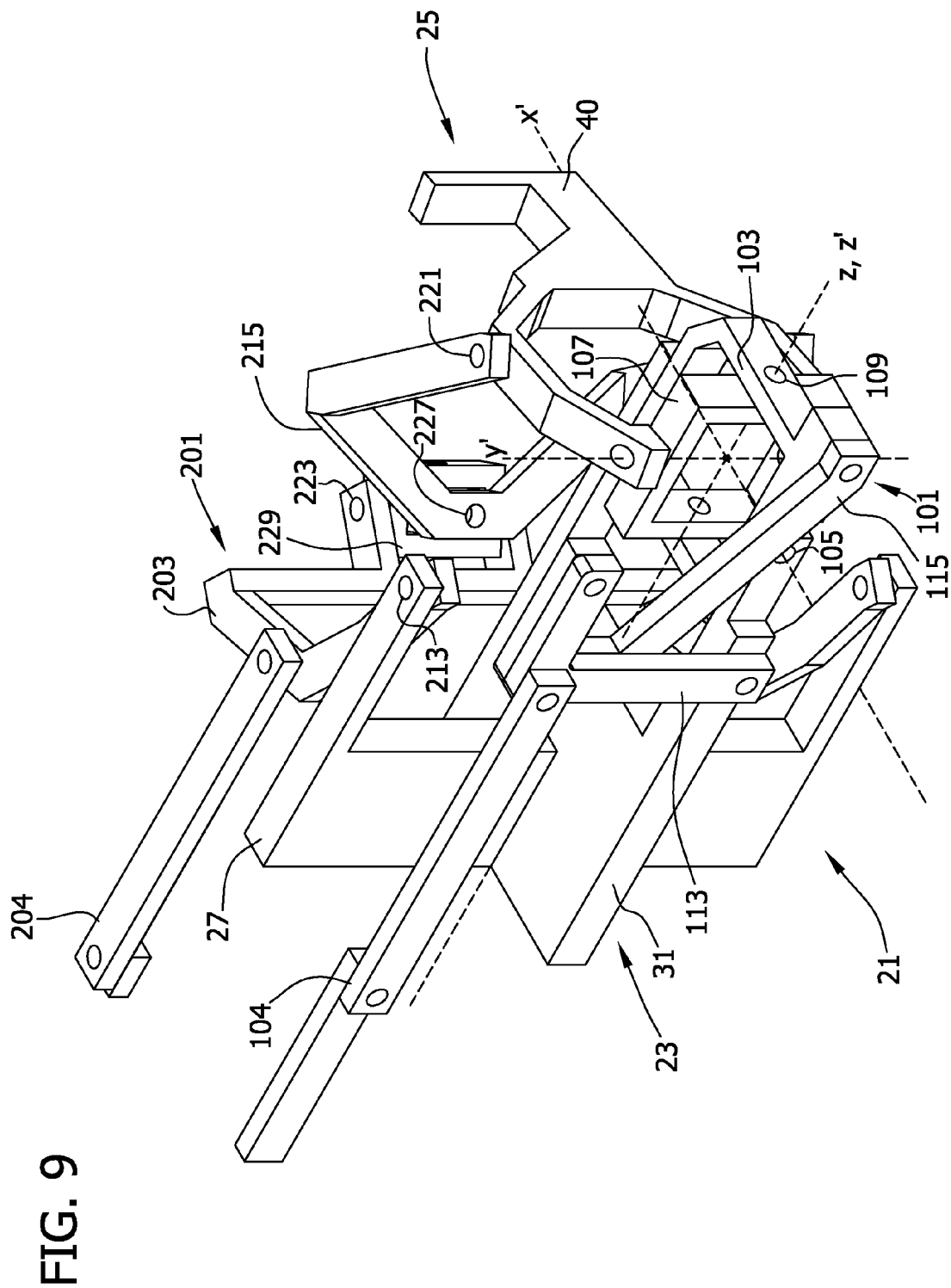
FIG. 9 is a perspective view of the robotic wrist of FIG. 1 with a pointer of the wrist deflected in yaw an angle of 100 degrees relative to the undeflected position of the pointer, the pitch deflection of the pointer being zero degrees.
Figure 10:
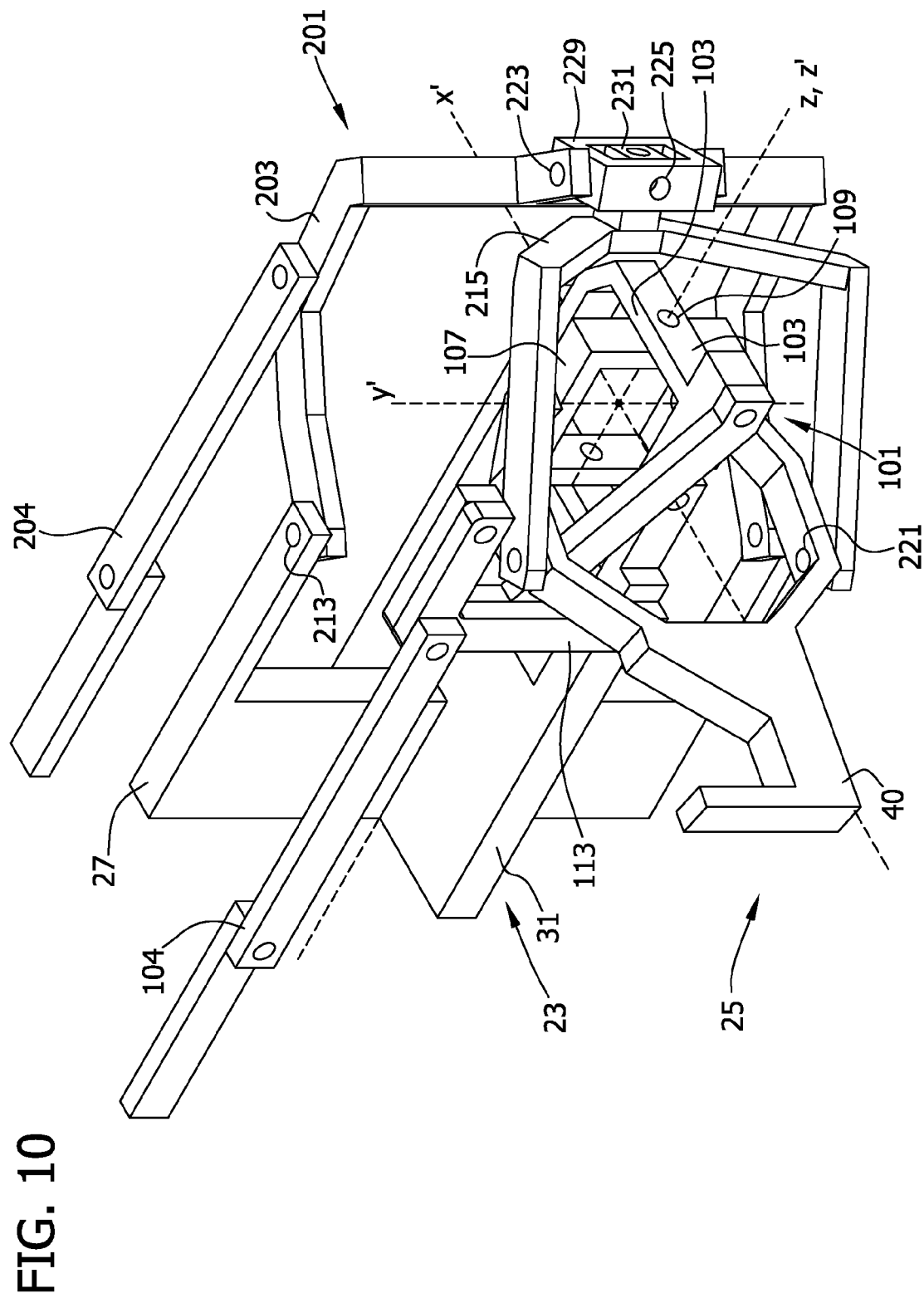
FIG. 10 is a perspective view of the robotic wrist of FIG. 1 with the pointer deflected in yaw an angle of −100 degrees relative to the undeflected position of the pointer, the pitch deflection of the pointer being zero degrees.
Figure 11:
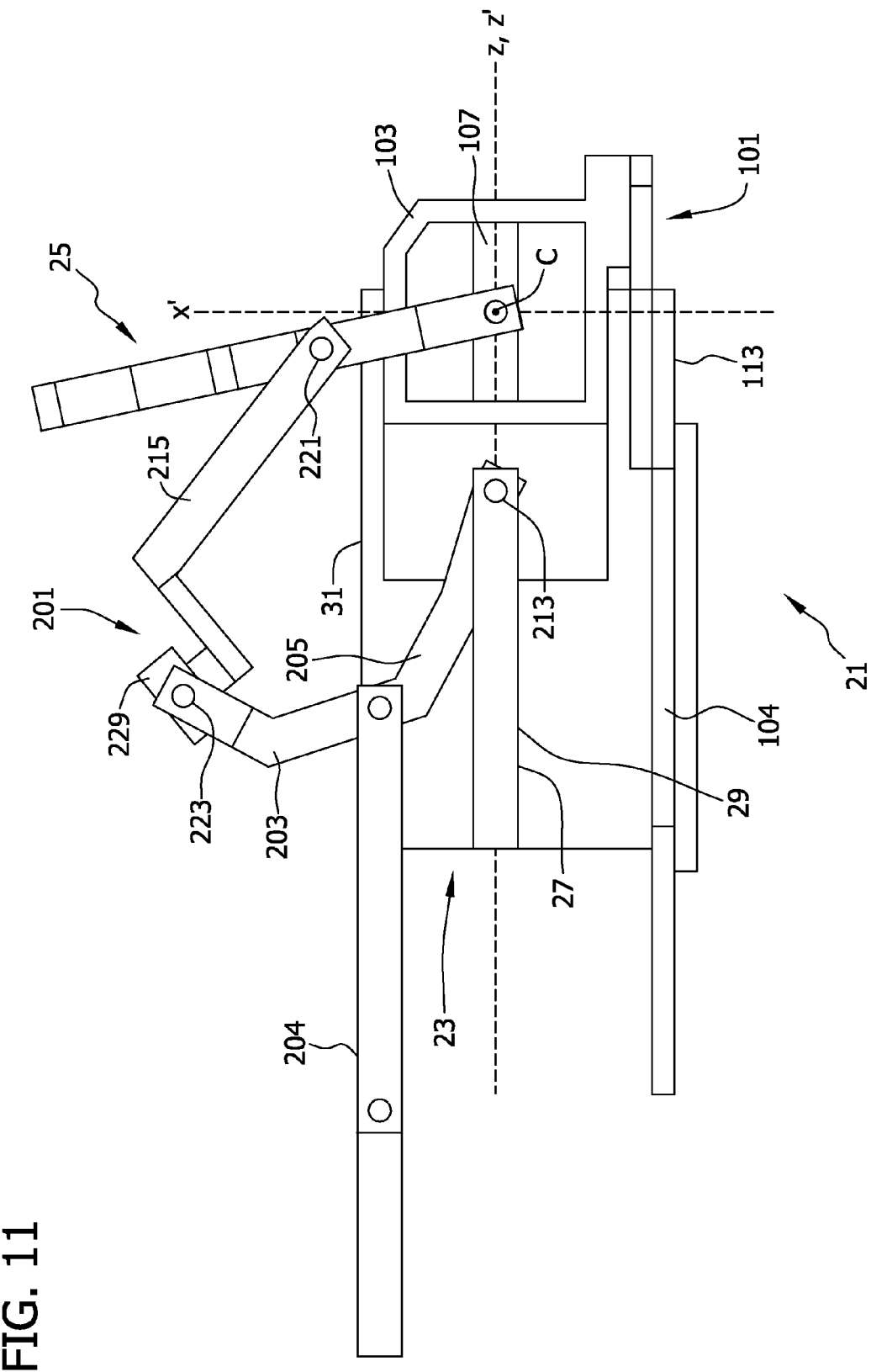
FIG. 11 is a top view of the robotic wrist of FIG. 1 with the pointer deflected in yaw an angle of 100 degrees relative to the undeflected position of the pointer (as in FIG. 9), the pitch deflection of the pointer being zero degrees.
Figure 12:
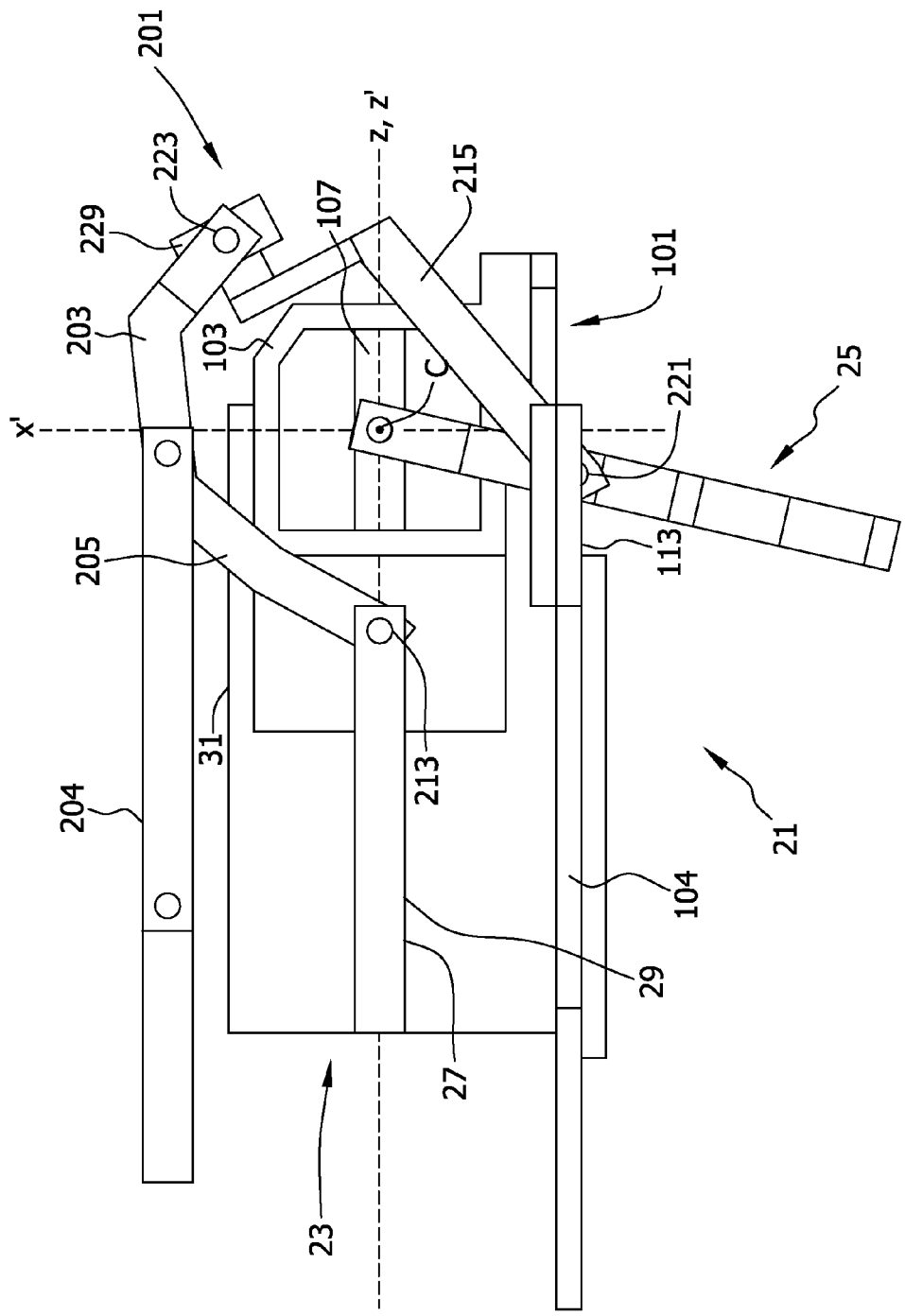
FIG. 12 is a top view of the robotic wrist of FIG. 1 with the pointer deflected in yaw an angle of −100 degrees relative to the undeflected position of the pointer (as in FIG. 10), the pitch deflection of the pointer being zero degrees.

A physical model constructed in accordance with the embodiment of FIGS. 1-17 demonstrates a wrist 21 that is free of singularities, and is also free from interferences for pointer 25 deflections up to at least about ±90 degrees in yaw and pitch (i.e., in any direction) and more suitably ±100 degrees in yaw and pitch, thereby exceeding a hemispherical pointer range of motion. For example, FIGS. 9 and 11 illustrate the wrist 21 with a pointer 25 yaw (Y'-axis) deflection of 100 degrees while FIGS. 10 and 12 illustrate the wrist with a pointer yaw deflection of −100 degrees. It can be seen from these Figures that the pointer 25 (e.g., the fork members 37 and interconnecting span 39 thereof) of the illustrated embodiment is suitably sized and configured to clear the pitch fork members 33 of the base 23 to permit yaw deflection up to ±100 degrees.

Figure 13:
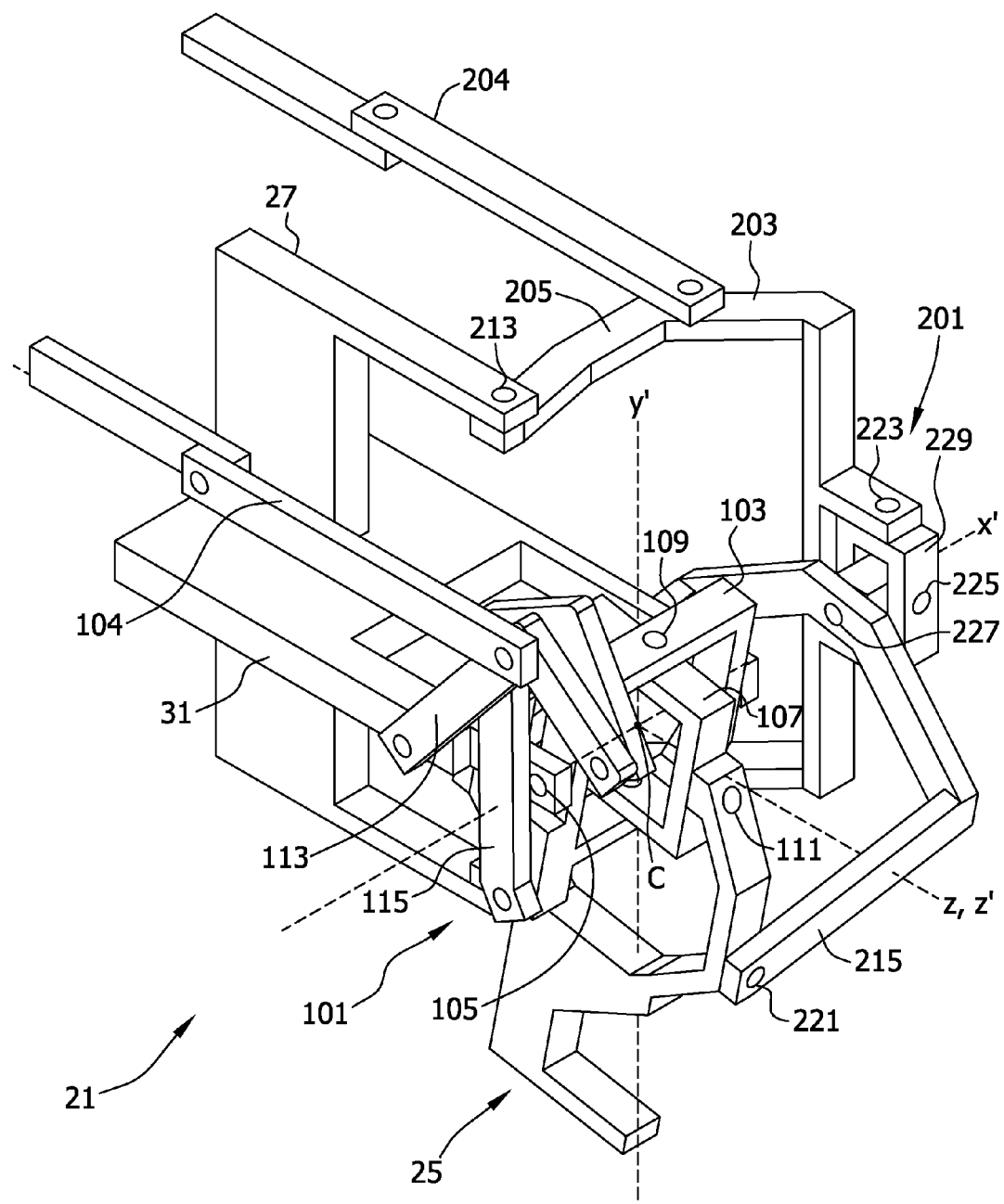
FIG. 13 is a perspective view of the robotic wrist of FIG. 1 with the pointer deflected in pitch an angle of 100 degrees relative to the undeflected position of the pointer, the yaw deflection of the pointer being zero degrees.
Figure 14:
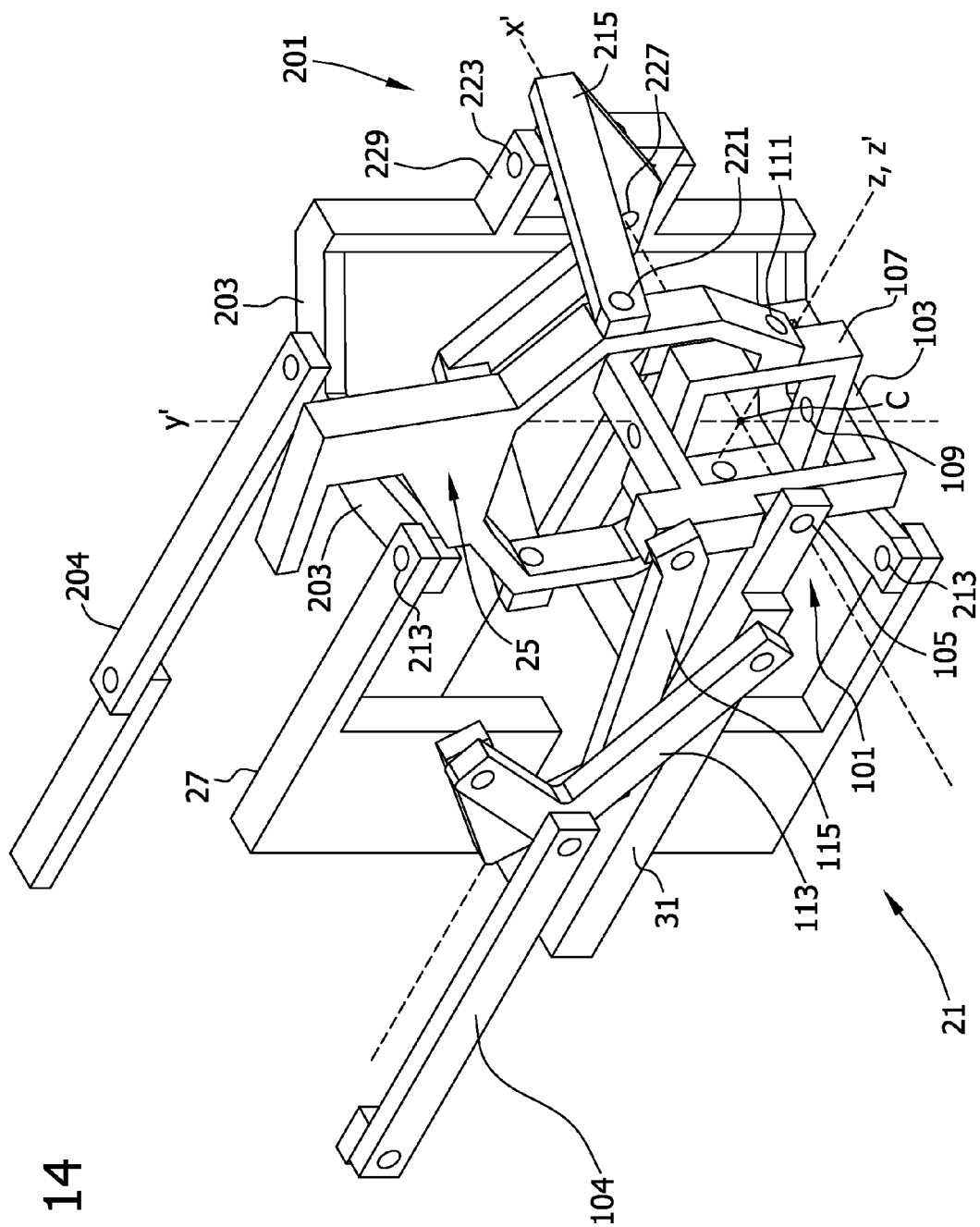
FIG. 14 is a perspective view of the robotic wrist of FIG. 1 with the pointer deflected in pitch an angle of −100 degrees relative to the undeflected position of the pointer, the yaw deflection of the pointer being zero degrees.
Figure 15:
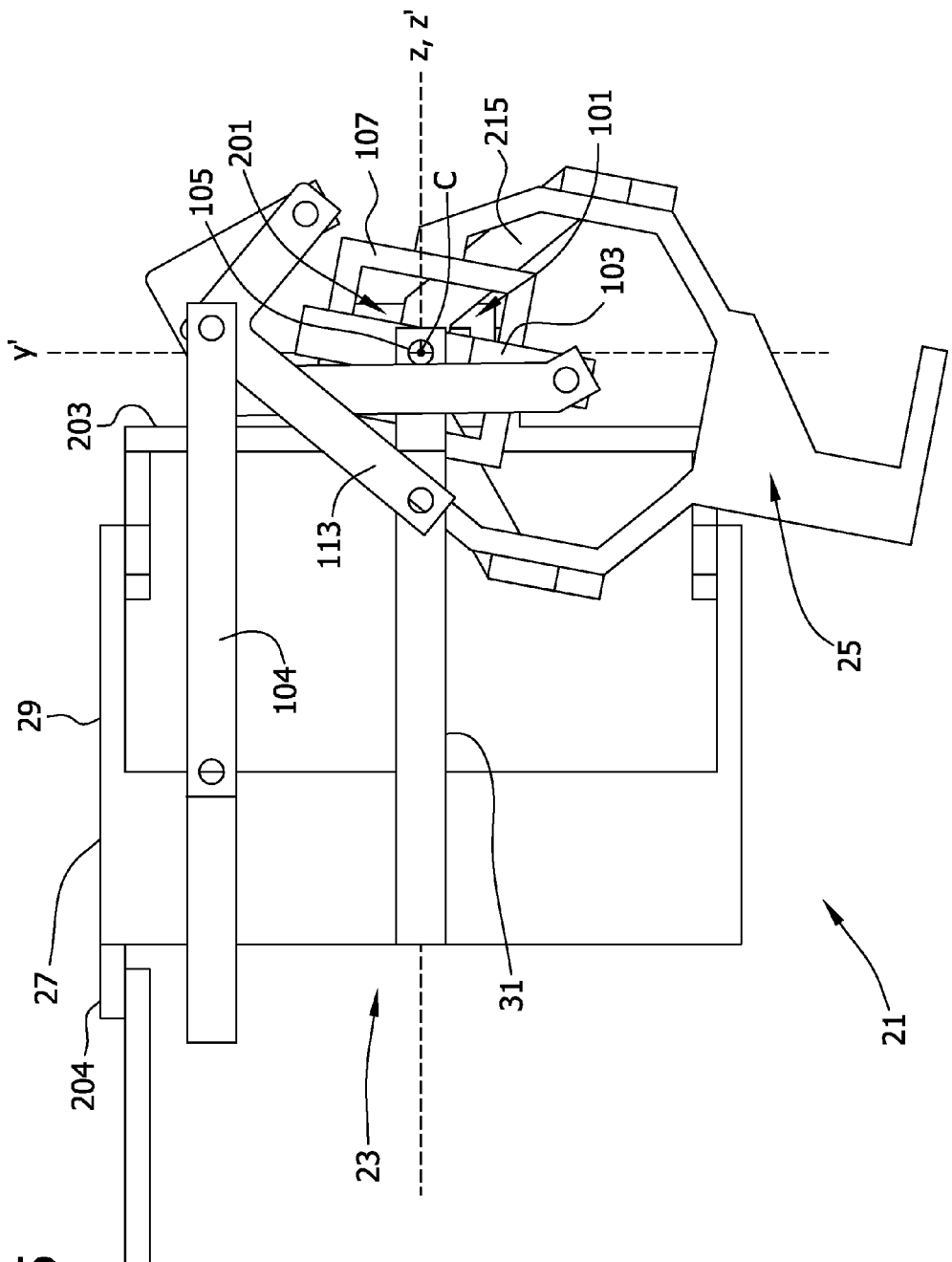
FIG. 15 is a side view of the robotic wrist of FIG. 1 with the pointer deflected in pitch an angle of 100 degrees relative to the undeflected position of the pointer (as in FIG. 13), the yaw deflection of the pointer being zero degrees.
Figure 16:
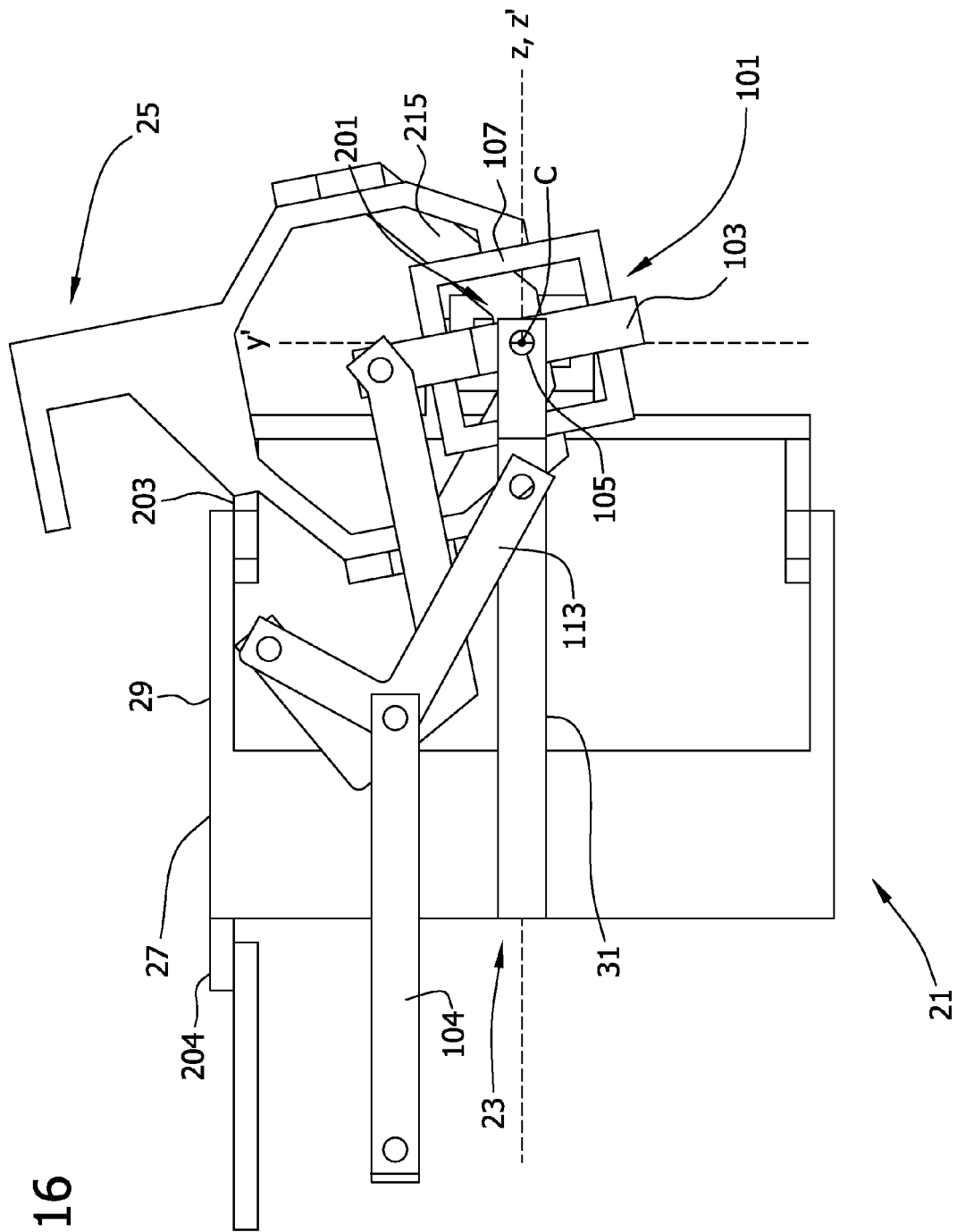
FIG. 16 is a side view of the robotic wrist of FIG. 1 with the pointer of the wrist deflected in pitch an angle of −100 degrees relative to the undeflected position of the pointer (as in FIG. 14), the yaw deflection of the pointer being zero degrees.
Figure 17:
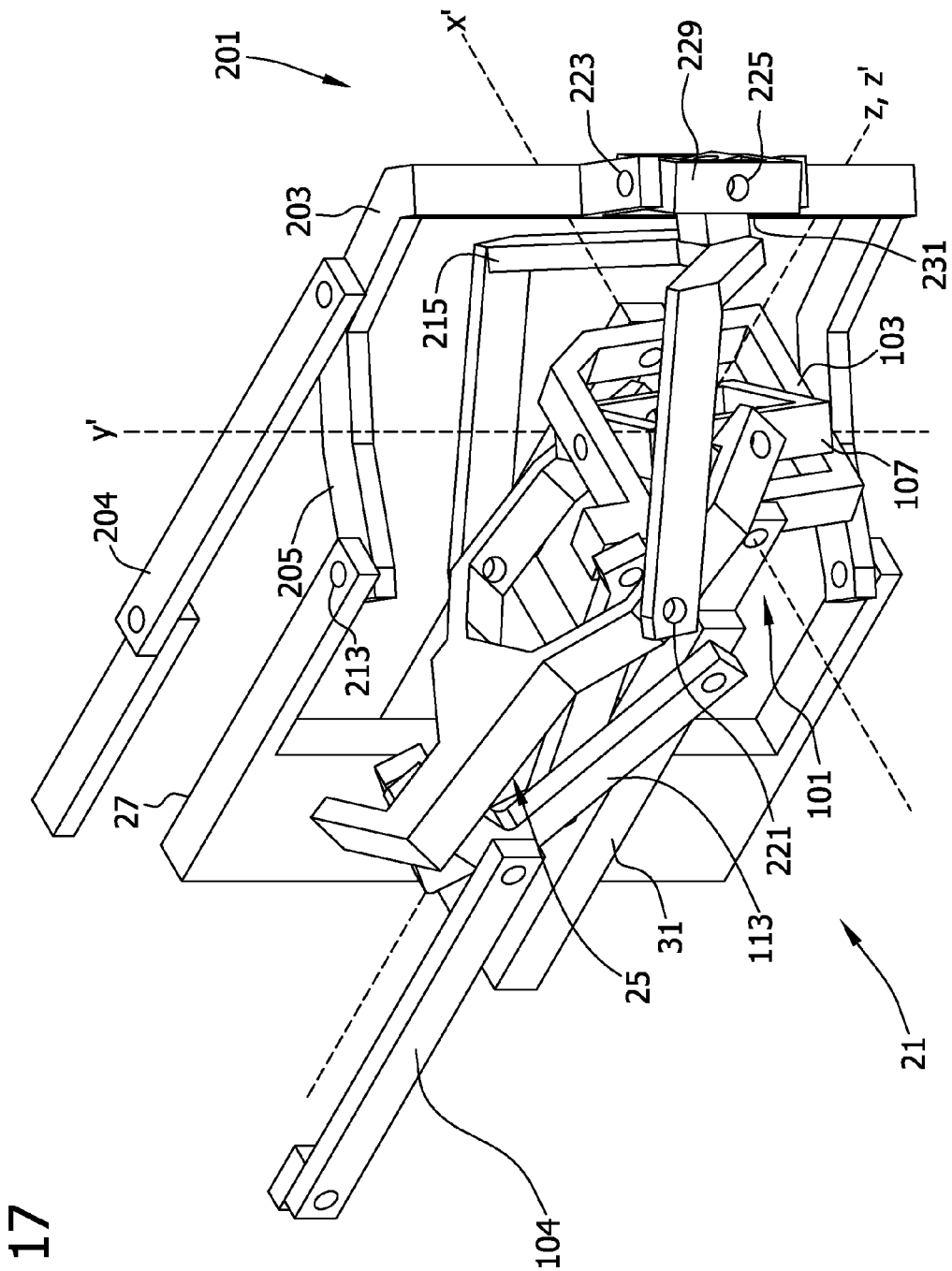
FIG. 17 is a perspective view of the robotic wrist of FIG. 1 with the pointer of the wrist deflected in both yaw and in pitch by the actuator pushrod displacements depicted in FIG. 10 and FIG. 14 but occurring at the same time.

FIGS. 13 and 15 illustrate the wrist 21 at a pointer 25 pitch deflection (with the pointer undeflected in yaw) of 100 degrees while FIGS. 14 and 16 illustrate the wrist at a pointer pitch deflection of −100 degrees. This counter-clockwise pitch rotation is recited as going from positive to negative rotation because the reference pitch axis X' is into the page of these Figures and the reference yaw axis Y' is oriented vertically, with the longitudinal or reference roll axis X' extending to the right. In viewing the pitch rotation sequence from 100 degrees to −100 degrees (compare, e.g., FIG. 15 with FIG. 16 and FIG. 1 which is at zero degrees pitch), the pitch crank 113 rotates relative to the base 23 through a total angle of about 100 degrees as the pitch rotor 103 (and hence the pointer 25) rotates in response to movement of the pitch coupler 115 through a total pitch deflection of 200 degrees, thus illustrating a reduction in crank angle suitable to actuate the pointer 25 in pitch from an actuating system operated from the robotic arm (e.g., from the base 23). FIG. 17 illustrates the wrist at one of its most deflected positions, namely, a pointer 25 yaw deflection of 100 degrees and a pointer pitch deflection of 100 degrees.

It can be seen that the various aspects of the wrist 21 are sized, arranged and configured to inhibit interferences between the various structural components upon movement of the pointer 25. For example, one or more aspects such as, but not limited to, the width and length of the pitch fork members 33 and the transverse spacing therebetween, the width and length of the yaw fork members 29 and the vertical spacing therebetween, the size and configuration of the pointer 25, the location of the center C of the pointer movement relative to the rotation axes of the yaw crank 203 and the yaw coupler 215 (where it connects to the pointer) are all considerations that can effect interference limits of the wrist. Accordingly, it is understood that in other embodiments these and/or other aspects of the wrist 21 may be sized, arranged and/or configured to permit less or more yaw and/or pitch deflection of the pointer and remain within the scope of this invention.

Figure 20:
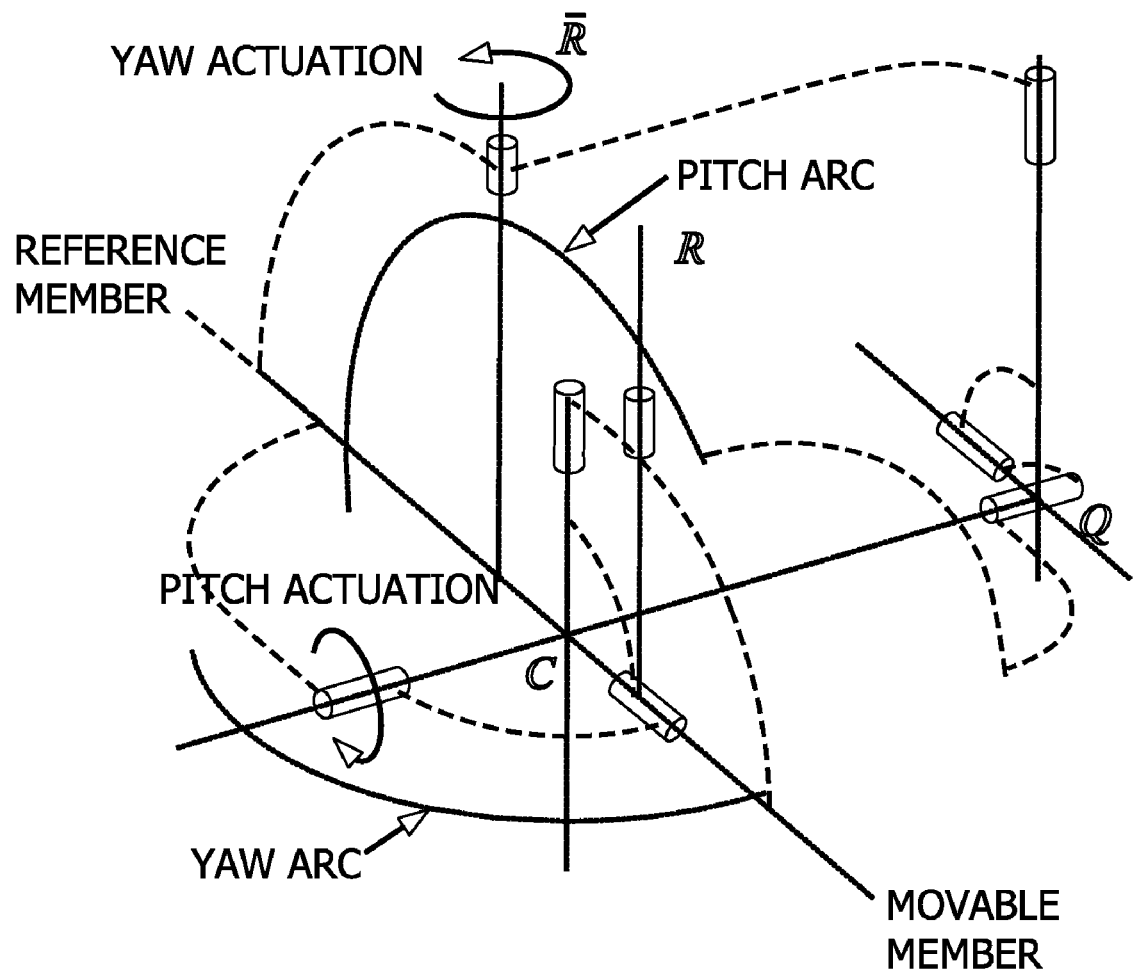
FIG. 20 is a schematic representation of the robotic wrist of FIG. 1.

The RSR Clemens linkage 201 with parallel spherical linkage (i.e., the RU linkage 101) constraint also establishes a constant velocity (CV) coupling between the input to and output of the robotic wrist 21. To illustrate the realization of this CV coupling for the two-axis wrist 21 actuated through the first revolute joints 105, 213 of the first and second serial chain linkages 101, 201 (e.g., where each linkage pivotally connects to the base 23), FIG. 20 schematically depicts the wrist 21 of the embodiments of FIGS. 1-17. The RSR Clemens linkage 201 schematically depicted in FIG. 20 consists of base-link revolute $\overline{R}$ (which is equivalent to the first revolute joint 213 of the embodiment of FIGS. 1-17), spherical center Q and pointer-link revolute R (e.g., revolute joint 221 of FIGS. 1-17). The parallel spherical linkage (e.g., the RU linkage 101) constraint has center C. The spherical joints at Q and at C are each realized by a set of three revolute joints on a corresponding common center.

FIG. 21 schematically illustrates the geometric arrangement of the robotic wrist 21 using triangles attached to the reference member (e.g., base 23) and movable member (e.g., pointer 25). In this illustration, revolute joint $\overline{R}$ represents the first revolute joint 213 of the RSR Clemens linkage 201 (where the yaw crank 203 pivotally connects to the base 223) and revolute joint R represents the last revolute joint 221 of the RSR Clemens linkage (where the yaw coupler 215 pivotally connects to the pointer 25). The distance $\overline{b}$ is the longitudinal offset from the first revolute joint 213 of the RSR Clemens linkage 201 to the center C of the spherical joint of the RU linkage 101 in the undeflected position of the pointer 25 and the distance b is the longitudinal offset from the last revolute joint 221 of the RSR Clemens linkage to the center C of the spherical joint of the RU linkage in the undeflected position of the pointer. In one particularly suitable embodiment, the robotic wrist 21 is configured such that these distances $\overline{b}$, b are substantially equal.

Distances $\overline{a}$, a from the respective first and last revolute joints $\overline{R}$, R (e.g., joints 213, 221) to the center Q of the spherical joint of the RSR Clemens linkage 201 are also suitably equal to each to each other. Additionally, these distances $\overline{a}$, a are suitably greater than the distances $\overline{b}$, b. The proportions of the structural components of the robotic wrist 21 may be otherwise chosen within these constraints to satisfy design requirements for strength, stiffness and freedom from collision between structural components over a desired range of pointer 25 deflections.

Owing to the aforementioned distance relationships, the line segment CQ connecting the center C of the RU linkage 101 and the center Q of the spherical linkage of the RSR Clemens linkage 201 will bisect the angle between the segment $\overline{RC}$ (along the longitudinal axis Z of the base 23) and the segment RC (along the yaw deflected and/or pitch deflected longitudinal or roll axis of the wrist 21—and hence the pointer 25). Due to common rotational mobility of the two spherical joints, the movable member, i.e., the pointer 25, remains free to rotate in pitch along the axis aligned with line segment CQ for every value of the yaw displacement angle. Thus, as the pointer 25 is deflected in yaw, it remains free to be displaced in pitch along the axis bisecting $\overline{RC}$ and RC.

Still referring to FIG. 21, a negative-valued pitch rotation is shown for purposes of viewing the triangles. The pitch deflection is about a common axis, and total pitch angle $-2\theta$ divides into symmetric parts $-\theta$ by virtue of the choice of a bisecting reference plane. The congruence $\overline{a} \cong a$ (i.e., the respective distances from the revolute joints 213, 221 to the center Q of the RSR Clemens linkage 201) and $\overline{b} \cong b$ (i.e., the respective distances from the revolute joints 213, 221 to the spherical center C of the RU linkage 101) established by equal lengths of links connecting revolute joints $\overline{R}$ and R to spherical joints C and Q. That $\overline{c} \cong c$ follows from the shared side, establishing the congruence of the base-link and pointer-link triangles by the side-side-side (SSS) theorem. As $\overline{\psi} + \overline{\alpha} = \psi + \alpha = \pi/2$, the congruent triangles establish $\overline{\alpha} \cong \alpha$ and hence $\overline{\psi} \cong \psi$, proving symmetric deflection in yaw.

Yaw angle $\psi$ is controlled by actuating base angle $\overline{\gamma} \cong \gamma$. Establishing the relationship between $\gamma$ and $\psi$, or equivalently $\gamma$ and $\alpha$ extends the forward and inverse kinematic relationships to actuation angle $\gamma$. Verifying that $\alpha$ is a monotonic function of $\gamma$ over a range of interest establishes that the relationship is invertible and does not add singularities.

The Law of Cosines for planar triangles establishes the relationship between $\gamma$ and $\alpha$ with the implicit functions:

$$c^2 = a^2 + b^2 - 2ab \cos \gamma,$$

$$a^2 = b^2 + c^2 - 2bc \cos \alpha.$$

Solving for positive-valued length c in the first function and substituting into the second function expresses cos $\alpha$ in terms of cos $\gamma$. To show the relation between these angles is monotonic and hence solvable, invertible, and singularity-free over the interval $0 < \gamma < \pi$ and hence $1 > \cos \gamma > -1$, it follows from the first Law of Cosines relation that:

$$a^2 + b^2 - 2ab < c^2 < a^2 + b^2 + 2ab, \text{ or } (a-b)^2 < c^2 < (a+b)^2.$$

Expressing cos α as a function of length c in the second Law of Cosines relation:

$$\cos\alpha = f(c) = \frac{b^2 + c^2 - a^2}{2bc} \text{ and}$$

$$f'(c) = \frac{c^2 + a^2 - b^2}{2bc^2} = \frac{N(c)}{D(c)}$$

Denominator term $D(c)=2bc^2>0$ for non-zero side lengths b and c. Numerator term $N(c)>(a-b)^2+a^2+b^2=2a(a-b)$ on account $c^2>(a-b)^2$. Specifying a design with $a>b$, $N(c)>0$, $D(c)>0$, and hence $f'(c)>0$ for $0<\gamma<180$ degrees, $180>\alpha>0$ degrees, and $-90$ degrees$<\psi<90$ degrees, establishing the monotone relation between actuation angle $\gamma$ and yaw half-angle $\psi$ over the required range.

The set of three revolute joints (e.g., depicting joints 105, 109, 111 of the RU linkage 101 of FIGS. 1-17) centered at point C in FIG. 20 serve as a parallel spherical constraint to the RSR Clemens linkage that provides symmetric yaw deflection. These three revolutes are divided into a base revolute that may be actuated to deflect the pointer link in pitch along with the remaining two revolutes forming a pair of gimbals of a U-joint. Realizing a spherical joint as an RU linkage thus provides both constraint as well as a second axis of pointer actuation.

A fully mobile spherical joint is a theoretical construct—realization of that joint with a ball-in-socket arrangement has limits on deflection in one or other axis on account of interference of the shaft connection to the ball with the boundaries of the socket. A construction of a spherical joint from three revolute joints has mechanism singularities to consider in addition to interferences between parts, both effects limiting the mobility. These singularities occur at postures where pairs of revolute joints become collinear or located 180 degrees apart from each other.

A three-revolute realization of a spherical joint in an initial non-singular posture can have the three revolute axes oriented 90 degrees apart from each other, each revolute aligned with the pitch, yaw, and roll axes at that posture. The pitch and yaw axes need greater than ±90 degrees of mobility to satisfy the requirements of the pointing mechanism. The roll axis makes up the angle error between a universal joint and the constant-velocity motion of the overall pointing mechanism, which is restricted to less than ±90 degrees over the non-singular range of deflection of the universal joint. The logical assignment of gimbals to axes is to align the first gimbal with the pitch axis, the intermediate gimbal with its restricted range to the roll axis to best avoid interferences, and the last gimbal to the yaw axis, giving the arrangement depicted in FIGS. 21, 22 and 23.

Figure 22:
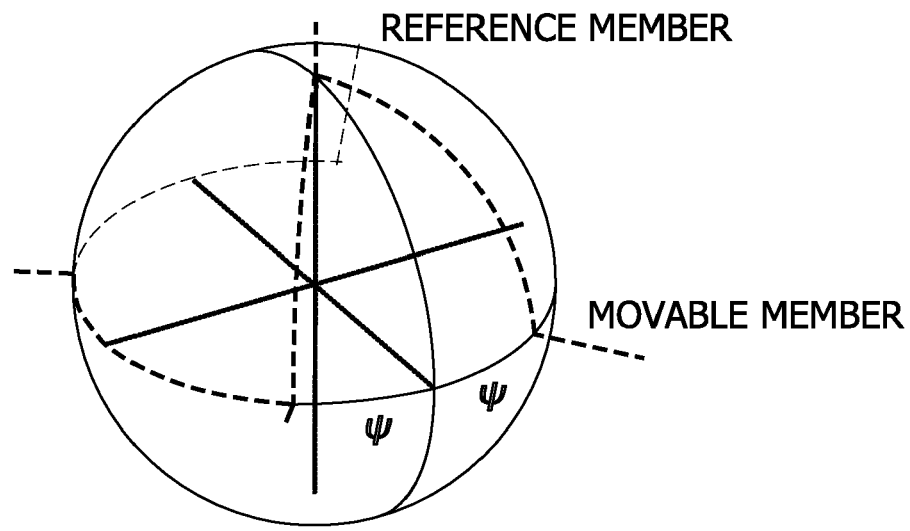
FIG. 22 is a schematic illustration of pointer deflection at zero initial pitch deflection but with a non-zero yaw angle.

The spherically constrained Clemens linkage deflects in a symmetric yaw-pitch-yaw rotation sequence. FIG. 22 illustrates the moveable member (e.g., pointer 25) deflected relative to the base (e.g., base 23) about the yaw gimbal in the amount of $2\psi$ at zero initial pitch deflection. As discussed previously, while $2\psi$ is the total yaw deflection, the pointer is deflected by half angle $\psi$ from the meridian of pitch deflection. That meridian splits the total yaw deflection into two equal parts owing to the symmetry condition already proved for the Clemens linkage 201.

Figure 23:
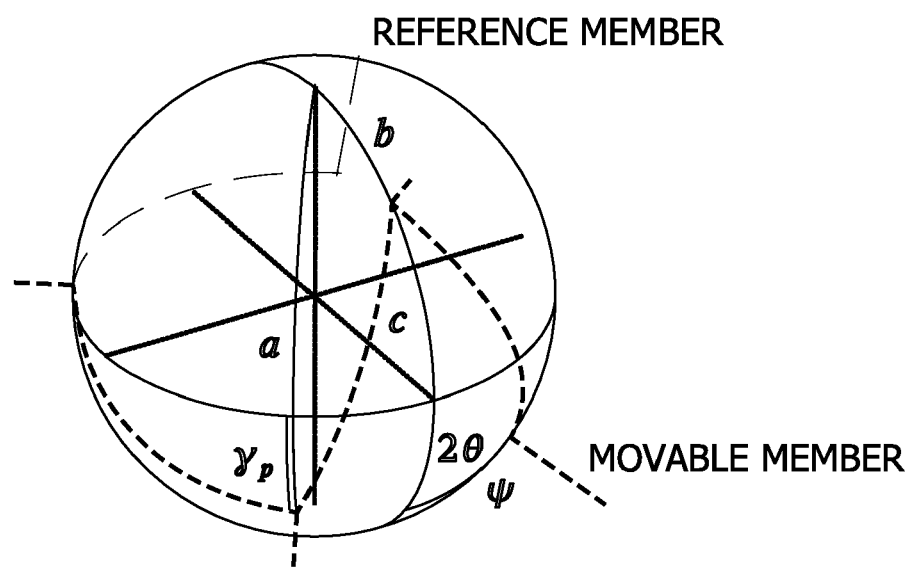
FIG. 23 is a schematic illustration similar to FIG. 22 but with the pointer deflected in pitch with the yaw angle of FIG. 22 held constant.

The initial pointer deflection $\psi$ from the meridian circle may be regarded either as a great-circle arc along the equator or as a companion dihedral angle at the pole. For the mechanism deflected in pitch as seen in FIG. 23, the pole moves along the meridian circle, and the pointer maintains a fixed dihedral angle $\psi$ with that pole. As the yaw gimbal moves along a meridian circle by total pitch angle $2\theta$, the pitch gimbal rotates through dihedral angle $\gamma_p$, having a companion great circle arc along a meridian circle that is angle $\psi$ westward from the pitch axis meridian.

Rotation about the pitch-actuation gimbal is thus communicated to rotation of the pointer about the true pitch axis through a universal joint deflected by angle $\psi$. The actuation angle may be related to the total pitch angle through the well-known shaft rotation formula for a universal joint. That this universal joint is only deflected by angle $\psi$ when the pointer is deflected by angle $2\psi$ allows full cycle rotation of the universal joint for pointer yaw deflections in excess of 90 degrees.

Thus, the pointer (i.e., the movable member) does not rotate about the great circle arc outlined by the pointer fork—that would imply a yaw-yaw-pitch rotation sequence. Rather, the pointer fork forms a constant dihedral angle $\psi$ to the principal meridian, the last part of the yaw-pitch-yaw rotation sequence, and these rotation sequences differ on account that rotation is not commutative. The pointer tip does not trace a great circle on the surface of a sphere, as would be the case with a full $2\psi$ deflection of the universal joint; the pointer instead has a cone motion, tracing a lesser circle on the sphere in relation to the principal meridian of pitch deflection.

The great circle arcs labeled a, b and c in FIG. 22 form a spherical triangle, with dihedral angle $\psi$ at the vertex coincident with the pole. The spherical Law of Cosines establishes:

$$\cos c = \cos a \cos b + \sin a \sin b \cos\psi$$

which for angle c=90 degrees owing to the arc length of the link connecting the roll and yaw gimbals, the relations $a=\gamma_p+90$ degrees, $b=2\theta$, it follows that:

$$0 = \sin\gamma_p \cos 2\theta + \cos\gamma_p \sin 2\theta \cos\psi, \text{ or}$$

$$\tan\gamma_p = \tan 2\theta \cos\psi,$$

which is the Law of Cosines relation for a 90-degree spherical triangle and the well-known shaft angle relationship for a universal joint. This relation is non-singular and invertible for $-90<\psi<90$ degrees, allowing full-cycle actuation of pitch for total yaw deflections up to ±180 degrees.

Whereas symmetrically-actuated double U-joint pointing mechanisms are singularity-free up to a shaft deflection of 180 degrees, interferences limit the working space to a value well less than that. For example, Wiitala and Stanisic as discussed in the Background section above claim a hemisphere of working space (90 degrees of shaft deflection) for a prototype wrist. V. Milenkovic, also discussed in the above Background section, claims 50 degrees of deflection on each of a pair of base actuators controlling yaw and pitch half angles for another prototype wrist, either individually or in combination, giving a total shaft deflection of at least 100 degrees. A spherical pointer has interference between the pointer and base shafts at 180 degrees. In theory, the mechanism of V. Milenkovic should achieve that limiting orientation because the offset between sphere centers eliminates that interference. In practice, the working space is limited to well below 180 degrees owing to clearances required for actuator rods.

Allowing maximum deflection on both the yaw and pitch axes at the same time will result in total shaft deflection exceeding that from a maximum yaw or pitch deflection alone. The advantage of allowing actuation of both the pitch and yaw axes up to maximum amounts is that the pointing mechanism can be protected against over rotation, using independent mechanical stops or electrical limit switches on each of the controlled axes. Expressing pointing as actuation of a constant-velocity coupling results in a variable amount of allowed shaft deflection for different values of shaft rotation; for some shaft rotations, the allowed shaft deflection may exceed what is required. A less demanding condition with regard to interferences may be limiting the total shaft deflection to a maximum value such as 100 degrees for all values of shaft rotation. That condition may be enforced in the computer control system where the limits on actuator deflection conforming to a working envelope limited by shaft deflection can be computed.

Figure 24:
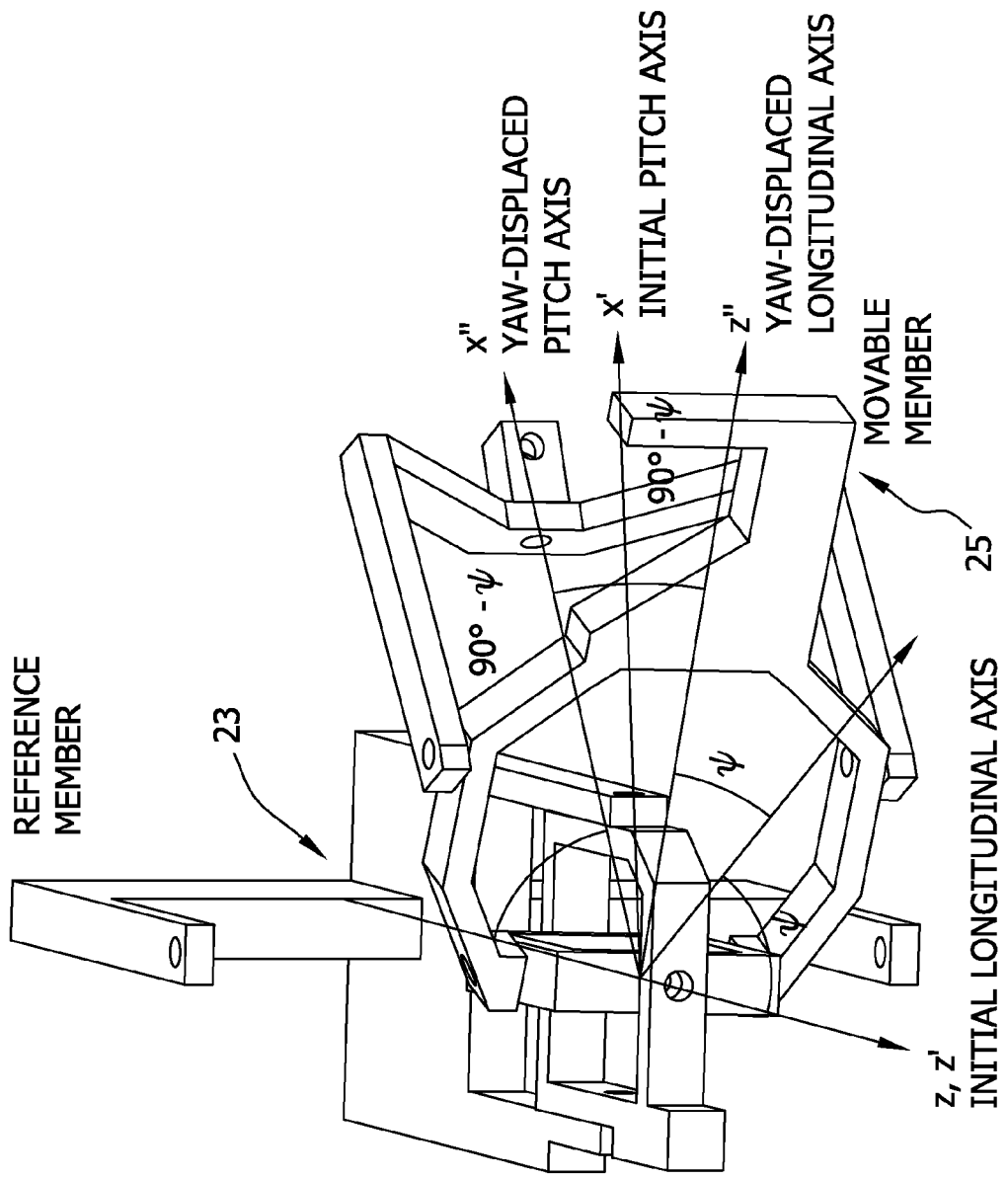
FIG. 24 is a kinematic illustration of a robotic wrist similar to that of FIG. 1, depicted with links on one serial chain hidden, with the pointer deflected in yaw and labeled with the axis about which pitch rotation occurs for that yaw angle.

To further illustrate the above point, FIG. 24 illustrates a robotic wrist similar to the robotic wrist 21 of FIGS. 1-17 with parts of the parallel RSR Clemens linkage 201 hidden. Where the RSR Clemens linkage 201 removed and the central revolute joint 109 of the RU linkage 101 locked against movement (e.g., locked against roll movement), such a wrist would function as a common type of universal joint two-axis wrist. Were the pointer is deflected 90 degrees in yaw, the yaw displaced pitch axis X" of the wrist would be transverse to the initial wrist pitch axis X' (i.e., the rotation axis about which the first revolute (R) joint of the RU linkage 101 is driven by the pitch drive system) and coaxial with the yaw displaced longitudinal or roll axis Z" of the wrist—resulting in the gimbal lock singularity condition. At this position, rotation of the wrist on the initial pitch axis X' (e.g., by the pitch drive system) spins the movable member in roll (e.g., on yaw displaced roll axis Z") without changing its pointing direction.

Figure 25:
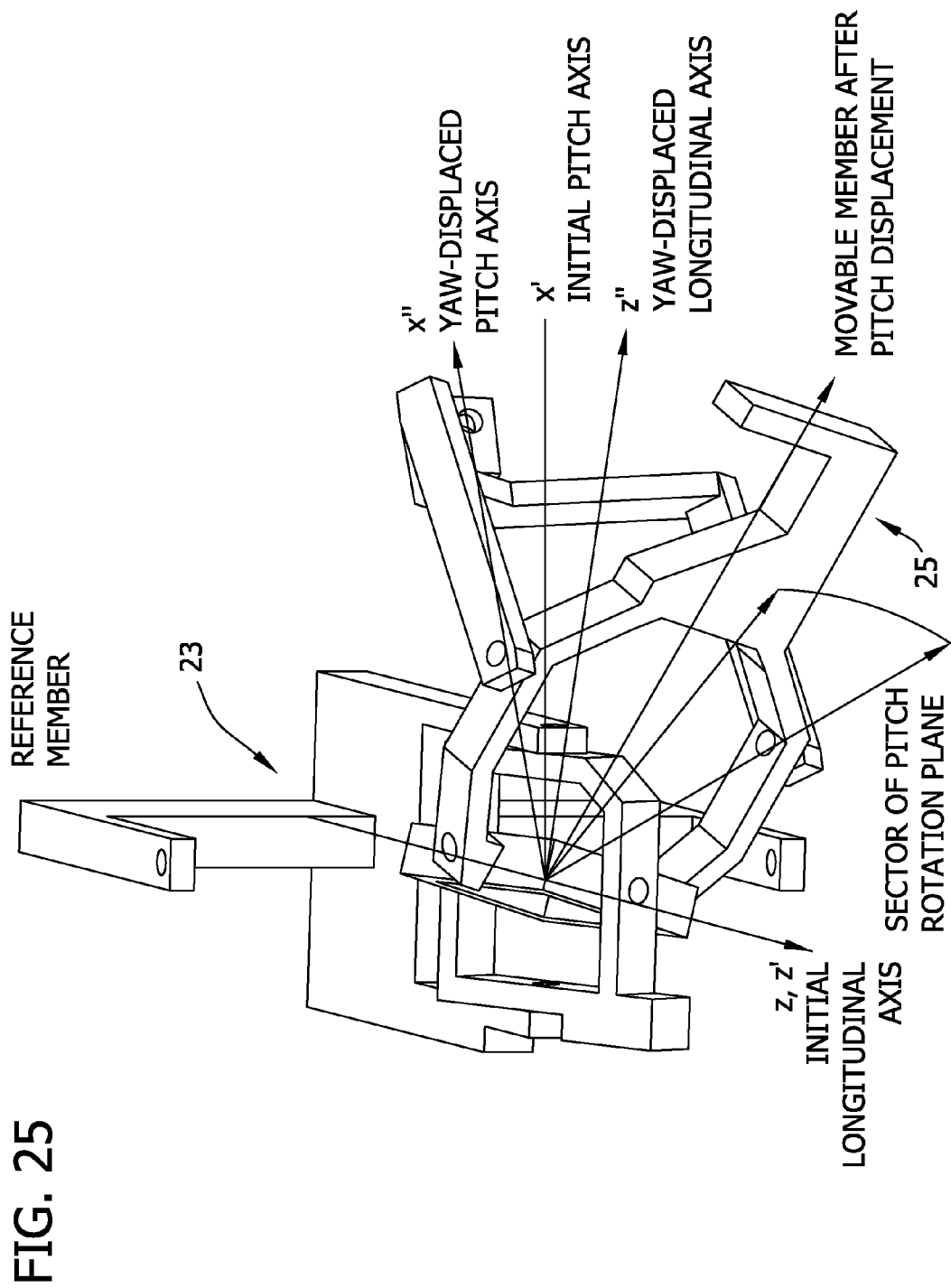
FIG. 25 is a kinematic illustration of the robotic wrist of FIG. 1 with the pointer deflected in pitch at the constant yaw angle from FIG. 24 to illustrate the yaw-displaced pitch axis.

FIG. 25 illustrates the robotic wrist 21 of FIGS. 1-17 with the parallel RU linkage 101 and RSR Clemens linkage 201 fully mobile. In this arrangement, the rotation axis for pitch does not stay fixed as the yaw angle varies. As discussed previously in reference to FIG. 21, the pitch rotation axis bisects the angle between the longitudinal axis Z of the base 23 (and hence the initial roll axis Z' of the wrist 21 in the undeflected position of the pointer 25) and the yaw displaced longitudinal or roll axis Z" of the wrist. As the movable member (i.e., the pointer 25) is deflected in yaw, the pitch rotation axis is also displaced in a way that the yaw displaced pitch axis X" of the wrist never aligns with the longitudinal axis Z of the base (and hence the yaw displaced longitudinal or roll axis Z" is never coaxial with initial pitch axis X') of the wrist 21 so that gimbal lock never occurs—or at least not until a full 180 degrees of yaw deflection is achieved.

Additionally, the effective shaft deflection angle of the universal (U) joint member of the RU linkage 101 is the angle between the reference or initial pitch axis X' of the wrist in the undeflected position of the pointer 25, and the yaw-displaced pitch axis X" which passes between the center C of the RU linkage 101 and the spherical joint of the RSR linkage 201. This shaft deflection angle is only one-half of total yaw angle on account of geometric relations that cause the spherical joint location to bisect the angle between the base and pointer. As illustrated in FIG. 25, the rotation plane of the movable member (i.e., the pointer) is perpendicular to the yaw-displaced pitch axis X". By geometric construction, the pointer direction (i.e., the yaw-displaced roll axis Z" of the wrist) is found to be inclined relative to that plane. Upon pitch displacement, then, the pointer will trace a cone.

Because the shaft deflection angle of the transverse universal joint is only one-half the yaw deflection angle, the wrist may be displaced in yaw in excess of 90 degrees, but the shaft deflection angle of that universal joint will be an amount below 90 degrees, and pitch deflection may be transmitted from the base through the that universal joint to the movable member (i.e., the pointer) through a full 360 degrees of rotation without encountering a singularity of the universal joint. The well-known relationship between the input and output shaft angle for a universal joint deflected less than 90 degrees is established by the spherical triangles illustrated in FIGS. 22 and 23.

The preceding analysis has established that for a constant yaw deflection, pitch deflection takes place along a fixed rotation axis tracing the meridian circle as depicted in FIG. 23. The robotic wrist 21 illustrated in the embodiments of FIGS. 1-17 and shown with the pointer 25 moved to various yaw and pitch position combinations, illustrates that actuation of at least about ±90 degrees and more suitably at least about ±100 degrees on each of the pitch or yaw axes or in combination (e.g., in any direction) is achievable without interference of the various wrist and base links.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A robotic system having a two-axis robotic wrist, said system comprising:

a reference member having a longitudinal axis, a movable member rotatably movable relative to the reference member, in an undeflected position of the movable member relative to the reference member said wrist having a pitch axis transverse to the longitudinal axis of the reference member for pitch rotation of the movable member relative thereto, a yaw axis perpendicular to the pitch axis and to the longitudinal axis of the reference member for yaw rotation of the movable member relative to the reference member, and a roll axis coaxial with the longitudinal axis of the reference member;

a first serial chain linkage connecting the movable member to the reference member, said first serial chain linkage comprising a revolute-universal (RU) linkage having a revolute joint pivotally connecting the RU linkage to the reference member and a universal joint pivotally connecting the movable member to the RU linkage, in the undeflected position of the movable member said revolute joint having a rotation axis and being oriented such that the rotation axis is coaxial with the pitch axis of the wrist, and a second serial chain linkage connecting the movable member to the reference member in a parallel relationship with the first serial chain linkage, said second serial chain linkage comprising a revolute-spherical-revolute (RSR) linkage, said RU linkage being configured together with the RSR linkage such that the movable member is constrained to spherical movement about a center (C) defined by the intersection of the pitch axis, the yaw axis and the roll axis of the wrist, said parallel relationship of the first and second serial chain linkages of the robotic wrist being singularity free and being non-overconstrained.

2. The robotic system set forth in claim 1 wherein the universal joint of the RU linkage comprises first and second revolute joints, in the undeflected position of the movable member the first revolute joint has a rotation axis coaxial with the longitudinal axis of the reference member and the second revolute joint has a rotation axis coaxial with the yaw axis of the wrist.

3. The robotic system set forth in claim 1 wherein the RSR linkage comprises a first revolute joint pivotally connecting the RSR linkage to the reference member, said first revolute joint having a rotation axis that is generally parallel to and longitudinally offset from the yaw axis of the wrist in the undeflected position of the movable member, and a second revolute joint pivotally connecting the RSR linkage to the movable member, said second revolute joint having a rotation axis that is generally parallel to and longitudinally offset from the yaw axis of the wrist in the undeflected position of the movable member.

4. The robotic system set forth in claim 3 further comprising a yaw actuating system operable to actuate the RSR linkage to drive rotation of the movable member in yaw relative to the reference member, and a pitch actuating system operable to actuate the RU linkage to drive rotation of the movable member in pitch relative to the reference member, the robotic system being limited to said yaw actuating system and said pitch actuating system for driving movement of the movable member relative to the reference member.

5. The robotic system set forth in claim 4 wherein the RSR linkage further comprises a spherical joint intermediate the first revolute joint and the second revolute joint, said yaw actuating system being mounted at least in part on the reference member and operatively connected to the RSR linkage intermediate the first revolute joint and the spherical joint.

6. The robotic system set forth in claim 5 wherein the pitch actuating system is mounted at least in part on the reference member and operatively connected to the RU linkage intermediate the revolute joint of the RU linkage and the universal joint thereof.

7. The robotic system set forth in claim 3 wherein the universal joint of the RU linkage comprises first and second revolute joints, in the undeflected position of the movable member the first revolute joint has a rotation axis coaxial with the longitudinal axis of the reference member and the second revolute joint has a rotation axis coaxial with the yaw axis of the wrist, the RU linkage and the RSR linkage being configured such that yaw deflection of the movable member is substantially two times a yaw deflection of the universal (U) joint in the RU linkage at said first revolute joint of said universal joint thereof other than in the undeflected position of the movable member.

8. The robotic system set forth in claim 1 wherein the RSR linkage comprises a spherical joint intermediate the movable member and the reference member.

9. The robotic system set forth in claim 8 wherein the spherical joint has a rotation axis coaxial with the rotation axis of the revolute joint of the RU linkage, said spherical joint rotation axis and said rotation axis of the revolute joint of the RU linkage lying on the pitch axis of the wrist in the undeflected position of the movable member.

10. The robotic system set forth in claim 8 wherein the spherical joint comprises a series of three revolute joints configured and arranged to be equivalent to a spherical joint, one of said three revolute joints having a rotation axis coaxial with the rotation axis of the revolute joint of the RU linkage.

11. The robotic system set forth in claim 1 further comprising a pitch actuating system operatively connected to the RU linkage intermediate the revolute joint and the universal joint thereof to drive rotation of the movable member in pitch relative to the reference member, and a crank angle reduction mechanism operatively connecting the pitch actuating system to the RU linkage whereby angular actuation of the crank angle reduction mechanism by the pitch actuating system effects pitch rotation of the movable member such that the pitch rotation of the movable member is substantially greater than the angular actuation of the crank angle reduction mechanism.

12. The robotic system set forth in claim 11 wherein the crank angle reduction mechanism comprises a scissor link, said scissor link comprising a crank pivotally connected to the reference member and a coupler pivotally connected to the RU linkage intermediate the revolute joint and the universal joint at a location offset from the pitch axis of the wrist, said crank and said coupler further being pivotally connected to each other.

13. The robotic system set forth in claim 1 wherein the reference member and the movable member comprise a pair of links of the robotic system, said RU linkage further comprising no more than two additional links, and said RSR linkage comprising no more than four additional links such that the robotic system comprises no more than 8 links.

14. The robotic system set forth in claim 13 wherein the spherical joint of the RSR linkage comprises a third revolute joint, a fourth revolute joint and a fifth revolute joint of said RSR linkage, the revolute joint of the RU linkage comprising a first revolute joint thereof, the universal joint of the RU linkage comprising a second revolute joint, and a third revolute joint of said RU linkage, said robotic system comprising no more than said eight revolute joints for movement of the movable member relative to the reference member.

15. The robotic system set forth in claim 1 wherein the RU linkage and the RSR linkage together comprise an intersecting-shaft constant velocity coupling between the reference member and the movable member.

16. The robotic system set forth in claim 15 wherein the RU linkage and the RSR linkage together constrain roll movement of the movable member, relative to the reference member, to a constant velocity constraint established by the RU linkage and RSR linkage.

17. A robotic system comprising a reference member having a longitudinal axis, and a two-axis robotic wrist connected to said reference member and having a movable member movable relative to said reference member in pitch and yaw, the robotic wrist being configured to limit yaw and pitch movement of the movable member to spherical movement thereof relative to the reference member with the robotic wrist being singularity free, being non-overconstrained, and being non-overactuated, wherein the robotic wrist comprises a pair of serial chain linkages, each said serial chain linkage connecting the movable member with the reference members, said serial chain linkages being in parallel relationship with each other, wherein the reference member has a longitudinal axis and the robotic wrist has a pitch axis and yaw axis, each of said serial chain linkages comprising a revolute joint pivotally connecting the respective serial chain linkage to the reference member, the revolute joint of one of said serial chain linkages having a rotation axis that in an undeflected position of the movable member is coaxial with the pitch axis of the wrist and transverse to the longitudinal axis of the reference member, the movable member being movable in pitch in response to rotation of the one of said serial chain linkages at the revolute joint thereof, the revolute joint of said other one of said serial chain linkages having a rotation axis parallel to and longitudinally offset from the yaw axis of the wrist, said movable member being movable in yaw in response to rotation of the said other one of said serial chain linkages at the revolute joint thereof.

18. The robotic system set forth in claim 17 wherein the robotic wrist comprises an intersecting-shaft constant velocity coupling between the reference member and the movable member.

19. The robotic system set forth in claim 18 wherein the robotic wrist is configured to constrain roll movement of the movable member, relative to the reference member, to a constant velocity constraint established by the wrist.

20. The robotic system set forth in claim 17 wherein said system is free from interferences throughout movement of the movable member up to at least ±90 degrees in any direction of movement thereof relative to the reference member.

21. The robotic system set forth in claim 20 wherein said system is free from interferences throughout movement of the movable member up to at least ±100 degrees in any direction of movement thereof relative to the reference member.

22. The robotic system set forth in claim 17 wherein the robotic wrist, apart from any actuating system operable to drive movement of the movable member, is constructed entirely from revolute joints, said wrist comprising no more than eight said revolute joints.

23. A robotic system having a two-axis wrist, said system comprising:
- a reference member having a longitudinal axis;
    - a movable member rotatably movable relative to the reference member, in an undeflected position of the movable member relative to the reference member said movable member having a pitch axis transverse to the longitudinal axis of the reference member for pitch rotation of the movable member relative thereto, a yaw axis perpendicular to the pitch axis of the movable member and to the longitudinal axis of the reference member for yaw rotation of the movable member relative to the reference member;
    - a first serial chain linkage connecting the movable member to the reference member; and
    - a second serial chain linkage connecting the movable member to the reference member in parallel relationship with the first serial chain linkage;
    - said first and second serial chain linkages being configured such that the robotic system is singularity free, is non-overconstrained, and wherein the first and second serial chain linkages defining an intersecting-shaft constant velocity coupling between the reference member and the movable member, wherein the first serial chain linkage comprises a revolute-universal (RU) linkage having a revolute joint pivotally connecting the RU linkage to the reference member and a universal joint pivotally connecting the movable member to the RU linkage, the second serial chain linkage comprising a revolute-spherical-revolute (RSR) linkage having a first revolute joint pivotally connecting the RSR linkage to the reference member and a second revolute joint pivotally connecting the reference member to the RSR linkage.

24. The robotic system set forth in claim 23 wherein the revolute joint of the RU linkage has a rotation axis that is transverse to the longitudinal axis of the reference member in an undeflected position of the movable member, and wherein said rotation axis is coaxial with the pitch axis of the movable member in the undeflected position of the movable member.

* * * * *